US010007858B2

(12) United States Patent
Bremer et al.

(10) Patent No.: US 10,007,858 B2
(45) Date of Patent: Jun. 26, 2018

(54) TERMINALS AND METHODS FOR DIMENSIONING OBJECTS

(75) Inventors: Edward C. Bremer, Victor, NY (US); Matthew Pankow, Camillus, NY (US)

(73) Assignee: Honeywell International Inc., Fort Mill, SC (US)

( * ) Notice: Subject to any disclaimer, the term of this patent is extended or adjusted under 35 U.S.C. 154(b) by 101 days.

(21) Appl. No.: 13/471,973

(22) Filed: May 15, 2012

(65) Prior Publication Data

US 2013/0307964 A1 Nov. 21, 2013

(51) Int. Cl.
*H04N 7/18* (2006.01)
*G06K 9/22* (2006.01)
*G01B 11/02* (2006.01)

(52) U.S. Cl.
CPC ............... *G06K 9/22* (2013.01); *G01B 11/02* (2013.01); *H04N 7/188* (2013.01)

(58) Field of Classification Search
None
See application file for complete search history.

(56) References Cited

U.S. PATENT DOCUMENTS

| 3,971,065 A | 7/1976 | Bayer |
| 4,279,328 A | 7/1981 | Ahlbom |
| 4,398,811 A | 8/1983 | Nishioka et al. |
| 4,495,559 A | 1/1985 | Gelatt, Jr. |
| 4,730,190 A | 3/1988 | Win et al. |
| 4,803,639 A | 2/1989 | Steele et al. |
| 5,175,601 A | 12/1992 | Fitts |
| 5,184,733 A | 2/1993 | Arnarson et al. |
| 5,220,536 A | 6/1993 | Stringer et al. |
| 5,331,118 A | 7/1994 | Jensen |
| 5,359,185 A | 10/1994 | Hanson |

(Continued)

FOREIGN PATENT DOCUMENTS

| AU | 2004212587 A1 | 4/2005 |
| CN | 201139117 Y | 10/2008 |

(Continued)

OTHER PUBLICATIONS

U.S. Appl. No. 14/274,858 for Mobile Printer With Optional Battery Accessory, filed May 12, 2014, (Marty et al.); 26 pages.

(Continued)

*Primary Examiner* — Andy Rao
*Assistant Examiner* — Samuel D Fereja
(74) *Attorney, Agent, or Firm* — Additon, Higgins & Pendleton, P.A.

(57) ABSTRACT

A terminal for measuring at least one dimension of an object includes at least one imaging subsystem and an actuator. The at least one imaging subsystem includes an imaging optics assembly operable to focus an image onto an image sensor array. The imaging optics assembly has an optical axis. The actuator is operably connected to the at least one imaging subsystem for moving an angle of the optical axis relative to the terminal. The terminal is adapted to obtain first image data of the object and is operable to determine at least one of a height, a width, and a depth dimension of the object based on effecting the actuator to change the angle of the optical axis relative to the terminal to align the object in second image data with the object in the first image data, the second image data being different from the first image data.

26 Claims, 11 Drawing Sheets

(56) References Cited

U.S. PATENT DOCUMENTS

| | | |
|---|---|---|
| 5,384,901 A | 1/1995 | Glassner et al. |
| 5,548,707 A | 8/1996 | LoNegro |
| 5,555,090 A | 9/1996 | Schmutz |
| 5,561,526 A | 10/1996 | Huber et al. |
| 5,590,060 A | 12/1996 | Granville et al. |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,748,199 A | 5/1998 | Palm |
| 5,767,962 A | 6/1998 | Suzuki et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 | 12/2001 | Reinhardt et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,535,776 B1 | 3/2003 | Tobin et al. |
| 6,661,521 B1 | 12/2003 | Stern |
| 6,674,904 B1 | 1/2004 | McQueen |
| 6,705,526 B1 | 3/2004 | Zhu et al. |
| 6,781,621 B1 | 8/2004 | Gobush et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Marlton et al. |
| 7,137,556 B1 | 11/2006 | Bonner et al. |
| 7,159,783 B2 | 1/2007 | Walczyk et al. |
| 7,161,688 B1 | 1/2007 | Bonner et al. |
| 7,205,529 B2 | 4/2007 | Andersen et al. |
| 7,214,954 B2 | 5/2007 | Schopp |
| 7,277,187 B2 | 10/2007 | Smith et al. |
| 7,307,653 B2 | 12/2007 | Dutta |
| 7,310,431 B2 | 12/2007 | Gokturk et al. |
| 7,413,127 B2 | 8/2008 | Ehrhart et al. |
| 7,527,205 B2 * | 5/2009 | Zhu et al. ............ 235/462.14 |
| 7,586,049 B2 | 9/2009 | Wurz |
| 7,602,404 B1 | 10/2009 | Reinhardt et al. |
| 7,614,563 B1 | 11/2009 | Nunnink et al. |
| 7,639,722 B1 | 12/2009 | Paxton et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,974,025 B2 | 7/2011 | Topliss |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,061,610 B2 | 11/2011 | Nunnink |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,212,889 B2 | 7/2012 | Chanas et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,322,622 B2 | 12/2012 | Suzhou et al. |
| 8,339,462 B2 | 12/2012 | Stec et al. |
| 8,350,959 B2 * | 1/2013 | Topliss et al. ............ 348/374 |
| 8,351,670 B2 | 1/2013 | Ijiri et al. |
| 8,366,005 B2 | 2/2013 | Kotlarsky et al. |
| 8,371,507 B2 | 2/2013 | Haggerty et al. |
| 8,374,498 B2 | 2/2013 | Pastore |
| 8,376,233 B2 | 2/2013 | Van Horn et al. |
| 8,381,976 B2 | 2/2013 | Mohideen et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,437,539 B2 | 5/2013 | Komatsu et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,463,079 B2 | 6/2013 | Ackley et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,570,343 B2 | 10/2013 | Halstead |
| 8,571,307 B2 | 10/2013 | Li et al. |
| 8,576,390 B1 | 11/2013 | Nunnink |
| 8,579,200 B2 | 11/2013 | Samek et al. |
| 8,583,924 B2 | 11/2013 | Caballero et al. |
| 8,584,945 B2 | 11/2013 | Wang et al. |

(56) References Cited

U.S. PATENT DOCUMENTS

| | | |
|---|---|---|
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,897,596 B1 | 11/2014 | Passmore et al. |
| 9,014,441 B2 | 4/2015 | Truyen et al. |
| 9,082,195 B2 | 7/2015 | Holeva et al. |
| 9,142,035 B1 | 9/2015 | Rotman |
| 9,233,470 B1 | 1/2016 | Bradski et al. |
| 9,299,013 B1 | 3/2016 | Curlander et al. |
| 9,424,749 B1 | 8/2016 | Reed et al. |
| 9,486,921 B1 | 11/2016 | Straszheim et al. |
| 9,828,223 B2 | 11/2017 | Svensson et al. |
| 2001/0027995 A1 | 10/2001 | Patel et al. |
| 2001/0032879 A1* | 10/2001 | He et al. ............... 235/383 |
| 2002/0054289 A1 | 5/2002 | Thibault et al. |
| 2002/0105639 A1 | 8/2002 | Roelke |
| 2002/0109835 A1 | 8/2002 | Goetz |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0196534 A1 | 12/2002 | Lizotte et al. |
| 2003/0038179 A1 | 2/2003 | Tsikos et al. |
| 2003/0053513 A1* | 3/2003 | Vatan ............... G02B 26/10 372/109 |
| 2003/0063086 A1 | 4/2003 | Baumberg |
| 2003/0076421 A1* | 4/2003 | Dutta ............ H04N 5/23248 348/208.11 |
| 2003/0091227 A1 | 5/2003 | Chang et al. |
| 2003/0156756 A1 | 8/2003 | Gokturk et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1* | 6/2004 | Patel et al. ............ 235/472.01 |
| 2004/0122779 A1 | 6/2004 | Stickler et al. |
| 2004/0132297 A1 | 7/2004 | Baba et al. |
| 2004/0155975 A1* | 8/2004 | Hart et al. ............... 348/335 |
| 2004/0165090 A1 | 8/2004 | Ning |
| 2004/0184041 A1 | 9/2004 | Schopp |
| 2004/0211836 A1* | 10/2004 | Patel et al. ............ 235/462.11 |
| 2004/0214623 A1 | 10/2004 | Takahashi et al. |
| 2004/0008259 A1 | 11/2004 | Gokturk et al. |
| 2004/0233461 A1 | 11/2004 | Armstrong et al. |
| 2004/0258353 A1 | 12/2004 | Gluckstad et al. |
| 2005/0006477 A1* | 1/2005 | Patel ............... 235/462.24 |
| 2005/0117215 A1 | 6/2005 | Lange |
| 2005/0128193 A1 | 6/2005 | Popescu et al. |
| 2005/0128196 A1 | 6/2005 | Popescu et al. |
| 2005/0168488 A1 | 8/2005 | Montague |
| 2005/0211782 A1 | 9/2005 | Martin |
| 2005/0257748 A1 | 11/2005 | Kriesel et al. |
| 2005/0264867 A1 | 12/2005 | Cho et al. |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0109105 A1 | 5/2006 | Varner et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0232681 A1 | 10/2006 | Okada |
| 2006/0255150 A1* | 11/2006 | Longacre, Jr. ......... 235/462.45 |
| 2006/0269165 A1 | 11/2006 | Viswanathan |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1* | 3/2007 | Havens ............ G06K 7/10702 235/462.46 |
| 2007/0116357 A1 | 5/2007 | Dewaele |
| 2007/0127022 A1 | 6/2007 | Cohen et al. |

(56) References Cited

U.S. PATENT DOCUMENTS

| | | |
|---|---|---|
| 2007/0143082 A1 | 6/2007 | Degnan |
| 2007/0153293 A1 | 7/2007 | Gruhlke et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0047760 A1 | 2/2008 | Georgitsis |
| 2008/0050042 A1 | 2/2008 | Zhang et al. |
| 2008/0056536 A1 | 3/2008 | Hildreth et al. |
| 2008/0062164 A1 | 3/2008 | Bassi et al. |
| 2008/0077265 A1 | 3/2008 | Boyden |
| 2008/0079955 A1 | 4/2008 | Storm |
| 2008/0164074 A1 | 6/2008 | Wurz |
| 2008/0185432 A1 | 8/2008 | Caballero et al. |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |
| 2008/0273210 A1 | 11/2008 | Hilde |
| 2008/0278790 A1 | 11/2008 | Boesser et al. |
| 2009/0039167 A1* | 2/2009 | Wang .................. G01B 11/25 235/462.42 |
| 2009/0059004 A1 | 3/2009 | Bochicchio |
| 2009/0095047 A1 | 4/2009 | Patel et al. |
| 2009/0134221 A1 | 5/2009 | Zhu et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1* | 12/2009 | Dunn et al. .................. 356/635 |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Siris |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Amz |
| 2010/0274728 A1 | 10/2010 | Kugelman |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0040407 A1 | 2/2011 | Lim |
| 2011/0043609 A1 | 2/2011 | Choi et al. |
| 2011/0099474 A1 | 4/2011 | Grossman et al. |
| 2011/0169999 A1 | 7/2011 | Grunow et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0297590 A1 | 12/2011 | Ackley et al. |
| 2011/0301994 A1 | 12/2011 | Tieman |
| 2011/0303748 A1 | 12/2011 | Lemma et al. |
| 2011/0310227 A1 | 12/2011 | Konertz et al. |
| 2012/0024952 A1* | 2/2012 | Chen .................. G06K 7/10722 235/454 |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1* | 3/2012 | Ferren et al. ............ 235/462.21 |
| 2012/0081714 A1 | 4/2012 | Pangrazio et al. |
| 2012/0111946 A1 | 5/2012 | Golant |
| 2012/0113223 A1 | 5/2012 | Hilliges et al. |
| 2012/0126000 A1 | 5/2012 | Kunzig et al. |
| 2012/0138685 A1 | 6/2012 | Qu et al. |
| 2012/0140300 A1 | 6/2012 | Freeman |
| 2012/0168509 A1 | 7/2012 | Nunnink et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 9/2012 | Rodriguez et al. |
| 2012/0223141 A1 | 9/2012 | Good et al. |
| 2012/0224026 A1* | 9/2012 | Bayer et al. .................. 348/45 |
| 2012/0224060 A1 | 9/2012 | Gurevich et al. |
| 2012/0228382 A1 | 9/2012 | Havens et al. |
| 2012/0236126 A1* | 9/2012 | Tsuda .................. G03B 13/18 348/47 |
| 2012/0236288 A1 | 9/2012 | Stanley |
| 2012/0242852 A1 | 9/2012 | Hayward et al. |
| 2012/0113250 A1 | 10/2012 | Farlotti et al. |
| 2012/0248188 A1* | 10/2012 | Kearney .................. G06K 7/10722 235/440 |
| 2012/0256901 A1 | 10/2012 | Bendall |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0316820 A1 | 12/2012 | Nakazato et al. |
| 2013/0019278 A1 | 1/2013 | Sun et al. |
| 2013/0027521 A1* | 1/2013 | DeLuca .................. G02B 27/22 348/47 |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0128002 A1* | 5/2013 | Muramatsu .................. G03B 35/08 348/47 |
| 2013/0156267 A1 | 6/2013 | Muraoka et al. |
| 2013/0175341 A1 | 7/2013 | Kearney et al. |

(56) References Cited

U.S. PATENT DOCUMENTS

| | | |
|---|---|---|
| 2013/0175343 A1 | 7/2013 | Good |
| 2012/0201288 A1 | 8/2013 | Billerbeck et al. |
| 2013/0200150 A1 | 8/2013 | Reynolds et al. |
| 2013/0200158 A1 | 8/2013 | Feng et al. |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0256418 A1 | 10/2013 | Havens et al. |
| 2013/0257744 A1 | 10/2013 | Daghigh et al. |
| 2013/0257759 A1* | 10/2013 | Daghigh ............ G06F 3/0414 345/173 |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1* | 11/2013 | Hunt ................. G01B 11/00 345/420 |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0307964 A1 | 11/2013 | Bremer et al. |
| 2013/0308013 A1 | 11/2013 | Li et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0329012 A1 | 12/2013 | Bartos |
| 2013/0329013 A1 | 12/2013 | Metois et al. |
| 2013/0341399 A1 | 12/2013 | Xian et al. |
| 2013/0342343 A1 | 12/2013 | Harring et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0009586 A1* | 1/2014 | McNamer ........... H04N 13/021 348/50 |
| 2014/0019005 A1 | 1/2014 | Lee et al. |
| 2014/0021259 A1 | 1/2014 | Moed et al. |
| 2014/0025584 A1 | 1/2014 | Liu et al. |
| 2014/0027518 A1 | 1/2014 | Edmonds et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039674 A1 | 2/2014 | Motoyama et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061305 A1 | 3/2014 | Nahill et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0079297 A1 | 3/2014 | Tadayon et al. |
| 2014/0084068 A1 | 3/2014 | Gillet et al. |
| 2014/0091147 A1 | 4/2014 | Evans et al. |
| 2014/0097249 A1 | 4/2014 | Gomez et al. |
| 2014/0098091 A1 | 4/2014 | Hori |
| 2014/0098243 A1 | 4/2014 | Ghazizadeh |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0104664 A1 | 4/2014 | Lee |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Taskahashi |
| 2014/0140585 A1 | 5/2014 | Wang |
| 2014/0142398 A1 | 5/2014 | Patil et al. |
| 2014/0151453 A1 | 6/2014 | Meier et al. |
| 2014/0152882 A1 | 6/2014 | Samek et al. |
| 2014/0152975 A1 | 6/2014 | Ko |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0160329 A1 | 6/2014 | Ren et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0166760 A1 | 6/2014 | Meier et al. |
| 2014/0166761 A1 | 6/2014 | Todeschini et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175169 A1 | 6/2014 | Kosecki et al. |
| 2014/0175172 A1 | 6/2014 | Jovanovski et al. |
| 2014/0175174 A1 | 6/2014 | Barber |
| 2014/0177931 A1 | 6/2014 | Kocherscheidt et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0203087 A1 | 7/2014 | Smith et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0240454 A1 | 8/2014 | Lee |
| 2014/0247279 A1 | 9/2014 | Nicholas et al. |
| 2014/0247280 A1 | 9/2014 | Nicholas et al. |
| 2014/0267609 A1 | 9/2014 | Laffargue |
| 2014/0268093 A1 | 9/2014 | Tohme et al. |
| 2014/0270361 A1 | 9/2014 | Amma et al. |
| 2014/0306833 A1 | 10/2014 | Ricci |
| 2014/0307855 A1 | 10/2014 | Withagen et al. |
| 2014/0313527 A1 | 10/2014 | Askan |

(56) References Cited

U.S. PATENT DOCUMENTS

| | | | |
|---|---|---|---|
| 2014/0319219 | A1 | 10/2014 | Liu et al. |
| 2014/0320408 | A1 | 10/2014 | Zagorsek et al. |
| 2014/0347533 | A1 | 11/2014 | Ovsiannikov et al. |
| 2014/0350710 | A1 | 11/2014 | Gopalkrishnan et al. |
| 2014/0379613 | A1 | 12/2014 | Nishitani et al. |
| 2015/0009100 | A1 | 1/2015 | Haneda et al. |
| 2015/0009301 | A1 | 1/2015 | Ribnick et al. |
| 2015/0009338 | A1 | 1/2015 | Laffargue et al. |
| 2015/0036876 | A1 | 2/2015 | Marrion et al. |
| 2015/0049347 | A1 | 2/2015 | Laffargue et al. |
| 2015/0062369 | A1 | 3/2015 | Gehring et al. |
| 2015/0063676 | A1 | 3/2015 | Lloyd et al. |
| 2015/0070158 | A1 | 3/2015 | Hayasaka |
| 2015/0116498 | A1 | 4/2015 | Vartiainen et al. |
| 2015/0117749 | A1 | 4/2015 | Chen et al. |
| 2015/0149946 | A1 | 5/2015 | Benos et al. |
| 2015/0163474 | A1 | 6/2015 | You |
| 2015/0178900 | A1 | 6/2015 | Kim et al. |
| 2015/0201181 | A1 | 7/2015 | Herschbach |
| 2015/0204662 | A1 | 7/2015 | Kobayashi et al. |
| 2015/0213647 | A1 | 7/2015 | Laffargue et al. |
| 2015/0219748 | A1 | 8/2015 | Hyatt |
| 2015/0229838 | A1 | 8/2015 | Hakim et al. |
| 2015/0269403 | A1 | 9/2015 | Lei et al. |
| 2015/0276379 | A1 | 10/2015 | Ni et al. |
| 2015/0308816 | A1 | 10/2015 | Laffargue et al. |
| 2015/0316368 | A1 | 11/2015 | Moench et al. |
| 2015/0325036 | A1 | 11/2015 | Lee |
| 2015/0332463 | A1 | 11/2015 | Galera et al. |
| 2015/0355470 | A1 | 12/2015 | Herschbach |
| 2016/0169665 | A1 | 1/2016 | Deschenes et al. |
| 2016/0048725 | A1 | 2/2016 | Holz et al. |
| 2016/0063429 | A1 | 3/2016 | Varley et al. |
| 2016/0065912 | A1 | 3/2016 | Peterson |
| 2016/0090283 | A1 | 3/2016 | Svensson et al. |
| 2016/0090284 | A1 | 3/2016 | Svensson et al. |
| 2016/0138247 | A1 | 5/2016 | Conway et al. |
| 2016/0138248 | A1 | 5/2016 | Conway et al. |
| 2016/0138249 | A1 | 5/2016 | Svensson et al. |
| 2016/0187186 | A1 | 6/2016 | Coleman et al. |
| 2016/0187187 | A1 | 6/2016 | Coleman et al. |
| 2016/0187210 | A1 | 6/2016 | Coleman et al. |
| 2016/0191801 | A1 | 6/2016 | Sivan |
| 2016/0202478 | A1 | 7/2016 | Masson et al. |
| 2016/0203641 | A1 | 7/2016 | Bostick et al. |
| 2016/0223474 | A1 | 8/2016 | Tang et al. |
| 2017/0115490 | A1 | 4/2017 | Hsieh et al. |
| 2017/0121158 | A1 | 5/2017 | Wong |
| 2017/0182942 | A1 | 6/2017 | Hardy et al. |
| 2017/0336870 | A1 | 11/2017 | Everett et al. |

FOREIGN PATENT DOCUMENTS

| | | | |
|---|---|---|---|
| DE | 3335760 | A1 | 4/1985 |
| DE | 10210813 | A1 | 10/2003 |
| DE | 102007037282 | A1 | 3/2008 |
| EP | 1111435 | A2 | 6/2001 |
| EP | 1443312 | A1 | 8/2004 |
| EP | 1112483 | B1 | 5/2006 |
| EP | 1232480 | B1 | 5/2006 |
| EP | 2013117 | A1 | 1/2009 |
| EP | 2286932 | | 2/2011 |
| EP | 2372648 | A2 | 10/2011 |
| EP | 2381421 | A2 | 10/2011 |
| EP | 2533009 | A2 | 12/2012 |
| EP | 2562715 | A1 | 2/2013 |
| EP | 2722656 | A1 | 4/2014 |
| EP | 2779027 | A1 | 9/2014 |
| EP | 2833323 | | 2/2015 |
| EP | 2843590 | A1 | 3/2015 |
| EP | 2845170 | A1 | 3/2015 |
| EP | 2966595 | A1 | 1/2016 |
| EP | 3006893 | A1 | 3/2016 |
| EP | 3012601 | A1 | 3/2016 |
| EP | 3007096 | A1 | 4/2016 |
| GB | 2503978 | A | 1/2014 |
| GB | 2525053 | A | 10/2015 |
| GB | 2531928 | A1 | 5/2016 |
| JP | H04129902 | A | 4/1992 |
| JP | 200696457 | A | 4/2006 |
| JP | 2007084162 | A | 4/2007 |
| JP | 2008210276 | A | 9/2008 |
| JP | 2014210646 | A | 11/2014 |
| JP | 2015174705 | A | 10/2015 |
| KR | 20100020115 | A | 2/2010 |
| KR | 20110013200 | A | 2/2011 |
| KR | 20110117020 | A | 10/2011 |
| KR | 20120028109 | A | 3/2012 |
| WO | 96/40452 | A1 | 12/1996 |
| WO | 0114836 | A1 | 3/2001 |
| WO | 2006095110 | A1 | 9/2006 |
| WO | 2007015059 | A1 | 2/2007 |
| WO | 200712554 | A1 | 11/2007 |
| WO | 2011017241 | A1 | 2/2011 |
| WO | 2012175731 | A1 | 12/2012 |
| WO | 2013021157 | A1 | 2/2013 |
| WO | 2013033442 | A1 | 3/2013 |
| WO | 2013163789 | A1 | 11/2013 |
| WO | 2013166368 | A1 | 11/2013 |
| WO | 2013173985 | A1 | 11/2013 |
| WO | 20130184340 | A1 | 12/2013 |
| WO | 2014019130 | A1 | 2/2014 |
| WO | 2014102341 | A1 | 7/2014 |
| WO | 2014110495 | A1 | 7/2014 |
| WO | 2014149702 | A1 | 9/2014 |
| WO | 2014151746 | A2 | 9/2014 |
| WO | 2015006865 | A1 | 1/2015 |
| WO | 2016020038 | A1 | 2/2016 |
| WO | 2016061699 | | 4/2016 |
| WO | 2016061699 | A1 | 4/2016 |

OTHER PUBLICATIONS

U.S. Appl. No. 14/264,173 for Autofocus Lens System for Indicia Readers filed Apr. 29, 2014, (Ackley et al.); 39 pages.

U.S. Appl. No. 14/453,019 for Dimensioning System With Guided Alignment, filed Aug. 6, 2014 (Li et al.); 31 pages.

U.S. Appl. No. 14/452,697 for Interactive Indicia Reader, filed Aug. 6, 2014, (Todeschini); 32 pages.

U.S. Appl. No. 14/231,898 for Hand-Mounted Indicia-Reading Device with Finger Motion Triggering filed Apr. 1, 2014 (Van Horn et al.); 36 pages.

U.S. Appl. No. 29/486,759 for an Imaging Terminal, filed Apr. 2, 2014 (Oberpriller et al.); 8 pages.

U.S. Appl. No. 29/436,337 for an Electronic Device, filed Nov. 5, 2012 (Fitch et al.); 19 pages.

U.S. Appl. No. 29/458,405 for an Electronic Device, filed Jun. 19, 2013 (Fitch et al.); 22 pages.

U.S. Appl. No. 29/459,620 for an Electronic Device Enclosure, filed Jul. 2, 2013 (London et al.); 21 pages.

U.S. Appl. No. 29/459,681 for an Electronic Device Enclosure, filed Jul. 2, 2013 (Chaney et al.); 14 pages.

U.S. Appl. No. 29/459,785 for a Scanner and Charging Base, filed Jul. 3, 2013 (Fitch et al.); 21 pages.

U.S. Appl. No. 29/459,823 for a Scanner, filed Jul. 3, 2013 (Zhou et al.); 13 pages.

U.S. Appl. No. 29/468,118 for an Electronic Device Case, filed Sep. 26, 2013 (Oberpriller et al.); 44 pages.

U.S. Appl. No. 14/340,627 for an Axially Reinforced Flexible Scan Element, filed Jul. 25, 2014 (Reublinger et al.); 41 pages.

U.S. Appl. No. 29/492,903 for an Indicia Scanner, filed Jun. 4, 2014 (Zhou et al.); 23 pages.

U.S. Appl. No. 29/494,725 for an In-Counter Barcode Scanner, filed Jun. 24, 2014 (Oberpriller et al.); 23 pages.

U.S. Appl. No. 14/327,827 for a Mobile-Phone Adapter for Electronic Transactions, filed Jul. 10, 2014 (Hejl); 25 pages.

U.S. Appl. No. 14/334,934 for a System and Method for Indicia Verification, filed Jul. 18, 2014 (Hejl); 38 pages.

U.S. Appl. No. 14/339,708 for Laser Scanning Code Symbol Reading System, filed Jul. 24, 2014 (Xian et al.); 39 pages.

(56) References Cited

OTHER PUBLICATIONS

U.S. Appl. No. 14/379,057 for Method of Using Camera Sensor Interface to Transfer Multiple Channels of Scan Data Using an Image Format filed Aug. 15, 2014 (Wang et al.); 28 pages.
U.S. Appl. No. 14/283,282 for Terminal Having Illumination and Focus Control filed May 21, 2014 (Liu et al.); 31 pages.
U.S. Appl. No. 13/367,978, filed Feb. 7, 2012, (Feng et al.); now abandoned.
U.S. Appl. No. 14/376,472, for an Encoded Information Reading Terminal Including HTTP Server filed Aug. 4, 2014, (Lu); 30 pages.
U.S. Appl. No. 13/771,508 for an Optical Redirection Adapter, filed Feb. 20, 2013 (Anderson); 26 pages.
U.S. Appl. No. 14/340,716 for an Optical Imager and Method for Correlating a Medication Package With a Patient, filed Jul. 25, 2014 (Ellis); 26 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/370,267 for Industrial Design for Consumer Device Based Scanning and Mobility, filed Jul. 2, 2014 (Ma et al.); 45 pages.
U.S. Appl. No. 14/336,188 for Method of and System for Detecting Object Weighing Interferences, Filed Jul. 21, 2014 (Amundsen et al.); 34 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.

U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/462,801 for Mobile Computing Device With Data Cognition Software, filed on Aug. 19, 2014 (Todeschini et al.); 38 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/277,337 for Multipurpose Optical Reader, filed May 14, 2014 (Jovanovski et al.); 59 pages.
U.S. Appl. No. 14/300,276 for Method and System for Considering Information About an Expected Response When Performing Speech Recognition, filed Jun. 10, 2014 (Braho et al.); 31 pages.
U.S. Appl. No. 14/460,829 for Encoded Information Reading Terminal With Wireless Path Selecton Capability, filed Aug. 15, 2014 (Wang et al.); 40 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/460,387 for Apparatus for Displaying Bar Codes From Light Emitting Display Surfaces filed Aug. 15, 2014 (Van Horn et al.); 40 pages.
U.S. Appl. No. 14/310,226 for Autofocusing Optical Imaging Device filed Jun. 20, 2014 (Koziol et al.); 28 pages.
U.S. Appl. No. 14/305,153 for Indicia Reading System Employing Digital Gain Control filed Jun. 16, 2014 (Xian et al.); 53 pages.
U.S. Appl. No. 14/327,722 for Customer Facing Imaging Systems and Methods for Obtaining Images filed Jul. 10, 2014 (Oberpriller et al,); 39 pages.
U.S. Appl. No. 14/329,303 for Cell Phone Reading Mode Using Image Timer filed Jul. 11, 2014 (Coyle); 22 pages.
U.S. Appl. No. 14/370,237 for Web-Based Scan-Task Enabled System and Method of and Apparatus for Developing and Deploying the Same on a Client-Server Network filed Jul. 2, 2014 (Chen et al.); 65 pages.
U.S. Appl. No. 14/333,588 for Symbol Reading System With Integrated Scale Base filed Jul. 17, 2014 (Barten); 59 pages.
U.S. Appl. No. 14/446,387 for Indicia Reading Terminal Processing Plurality of Frames of Image Data Responsively to Trigger Signal Activation filed Jul. 30, 2014 (Wang et al.); 76 pages.
U.S. Appl. No. 14/446,391 for Multifunction Point of Sale Apparatus With Optical Signature Capture filed Jul. 30, 2014 (Good et al.); 37 pages.
Peter Clarke, Actuator Developer Claims Anti-Shake Breakthrough for Smartphone Cams, Electronic Engineering Times, p. 24, May 16, 2011.
European Search Report for application No. EP13186043 (now EP2722656 (Apr. 23, 2014)): Total pages 7.
International Search Report for PCT/US2013/039438 (WO2013166368), Oct. 1, 2013, 7 pages.
U.S. Appl. No. 13/912,262, not yet published, Filed Jun. 7, 2013, Hand Held Products Inc., Method of Error Correction for 3D Imaging Device: 33 pages.

(56) References Cited

OTHER PUBLICATIONS

U.S. Appl. No. 14/453,019, not yet published, Filed Aug. 6, 2014, Hand Held Products Inc., Dimensioning System With Guided Alignment: 31 pages.
European Office Action for application EP 13186043, dated Jun. 12, 2014 (now EP2722656 (Apr. 23, 2014)), Total of 6 pages.
U.S. Appl. No. 14/461,524, not yet published, Filed Aug. 18, 2014, Hand Held Products Inc., System and Method for Package Dimensioning: 21 pages.
U.S. Appl. No. 14/055,234, not yet published, Hand Held Products, Inc. Filed Oct. 16, 2013; 26 pages.
U.S. Appl. No. 14/519,179, Serge Thuries et al., filed Oct. 21, 2014, not published yet. 40 pages.
U.S. Appl. No. 14/519,249, H. Sprague Ackley et al., filed Oct. 21, 2014, not published yet. 36 pages.
U.S. Appl. No. 14/519,233, Franck Laffargue et al., filed Oct. 21, 2014, not published yet. 34 pages.
U.S. Appl. No. 14/519,211, H. Sprague Ackley et al., filed Oct. 21, 2014, not published yet. 33 pages.
U.S. Appl. No. 14/519,195, Franck Laffargue et al., filed Oct. 21, 2014, not published yet. 35 pages.
U.S. Appl. No. 14/490,989, not yet published, Filed Sep. 19, 2014, Intermec IP Corporation, Volume Dimensioning System Calibration Systems and Methods.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Appl. No. 61/149,912, filed Feb. 4, 2009 (now expired), 56 pages.
Dimensional Weight—Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
European Patent Office Action for Application No. 14157971.4-1906, dated Jul. 16, 2014, 5 pages.
European Patent Search Report for Application No. 14157971.4-1906, dated Jun. 30, 2014, 6 pages.
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages.
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008), 6 pages.
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages.
Proesmans, Marc et al. "Active Acquisition of 3D Shape for Moving Objects" 0-7803-3258-X196 1996 IEEE; 4 pages.
Extended European Search Report in counterpart European Application No. 15182675.7 dated Dec. 4, 2015, pp. 1-10, References previously cited.
Search Report and Opinion in Related EP Application 15176943.7, dated Jan. 8, 2016, 7 pages, (U.S. Appl. No. 2014/0049635 has been previously cited).
Search Report and Opinion in related GB Application No. 1517112.7, dated Feb. 19, 2016, 6 Pages (GB2503978 is a commonly owned now abandoned applicaation and not cited above).
Lloyd, Ryan and Scott McCloskey, "Recognition of 3D Package Shapes for Singe Camera Metrology" IEEE Winter conference on Applications of computer Visiona, IEEE, Mar. 24, 2014, pp. 99-106, {retrieved on Jun. 16, 2014}, Authors are employees of common Applicant.
European Search Report for Related EP Application No. 15189214.8, dated Mar. 3, 2016, 9 pages.
U.S. Appl. No. 14/800,757, Eric Todeschini, filed Jul. 16, 2015, not published yet, Dimensioning and Maging Items, 80 pages.
Proesmans, Marc et al. "Active Acquisition of 3D Shape for Moving Objects" 0-7803-3258-X/96 1996 IEEE; 4 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/715,916, H. Sprague Ackley, filed May 19, 2015, not published yet, Evaluating Image Values; 54 pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating A Volume Dimensioner; 63 pages.
U.S. Appl. No. 14/801,023, Tyler Doomenbal et al., filed Jul. 16, 2015, not published yet, Adjusting Dimensioning Results Using Augmented Reality, 39 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of An Interactive Technique for Creating Site Models from Range Data, Apr. 27-May 1, 1997, Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from http://repository.upenn.edu/cis_reports/736, Accessed May 31, 2015, 157 pages.
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG 10, 8 pages.
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.
EP Search and Written Opinion Report in related matter EP Application No. 14181437.6, dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.
Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.

(56) References Cited

OTHER PUBLICATIONS

Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, Filed Sep. 25, 2015, 59 pages, not yet published.
James Chamberlin, "System and Method for Picking Validation", U.S. Appl. No. 14/865,797, Filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 14/872,176, Filed Oct. 1, 2015, 44 pages, not yet published.
Wikipedia, "3D projection" Downloaded on Nov. 25, 2015 from www.wikipedia.com, 4 pages.
McCloskey et al., "Methods for Improving the Accuracy of Dimensioning-System Measurements," U.S. Appl. No. 14/873,613, Filed Sep. 2, 2015, 47 pages, not yet published.
Search Report in counterpart European Application No. 15182675.7, dated Dec. 4, 2015, 10 pages.
McCloskey et al., "Image Transformation for Indicia Reading," U.S. Appl. No. 14/982,032, filed Oct. 30, 2015, 48 pages, not yet published.
Great Britain Search Report for related Application On. GB1517843.7, dated Feb. 23, 2016; 8 pages.
European Search Report for related EP Application No. 15188440.0, dated Mar. 8, 2016, 8 pages.
Second Chinese Office Action in related CN Application No. 201520810685.6, dated Mar. 22, 2016, 5 pages, no references.
European Search Report in related EP Application No. 15190315.0, dated Apr. 1, 2016, 7 pages [Commonly owned Reference 2014/0104416 has been previously cited].
Second Chinese Office Action in related CN Application No. 2015220810562.2, dated Mar. 22, 2016, 5 pages. English Translation provided [No references].
European Search Report for related Application EP 15190249.1, dated Mar. 22, 2016, 7 pages.
Second Chinese Office Action in related CN Application No. 201520810313.3, dated Mar. 22, 2016, 5 pages. English Translation provided [No references].
Office Action in counterpart European Application No. 13186043.9 dated Sep. 30, 2015, pp. 1-7 [All references previously cited].
European Search Report for related EP Application No. 16152477.2, dated May 24, 2016, 8 pages [New Reference cited herein; Reference DE102007037282 A1 and its US Counterparts have been previously cited].
European Partial Search Report for related EP Application No. 15190306.9, dated May 6, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http;//www.outdoorphotographer.com/gear/lenses/get-the-most-out-ofvariable-aperture-lenses.html on Feb. 9, 2016; Cited in NPL #1].
United Kingdom Search Report in related application GB1517842.9, dated Apr. 8, 2016, 8 pages.
United Kingdom combined Search and Examination Report in related GB Application No. 1607394.2, dated Oct. 19, 2016, 7 pages.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134 [Examiner cited art in related US matter with Notice of Allowance dated Aug. 11, 2016].
European Extended Search Report in Related EP Application No. 16172995.9, dated Aug. 22, 2016, 11 pages (Only new references have been cited; U.S. Pat. No. 8463079 (formerly U.S. Publication No. 2010/0220894) and U.S. Publication No. 2001/0027955 have been previously cited.).

European Search Report from related EP Application No. 16168216.6, dated Oct. 20, 2016, 8 pages [New reference cited above; U.S. Publication 2014/0104413 has been previously cited].
European Extended search report in related EP Application No. 15190306.9, dated Sep. 9, 2016, 15 pages [only new references are cited; remaining references were cited with partial search report in same application dated May 6, 2016].
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_E1-Hakim/publication/44075058_A_Knowledge_Based_EdgeObject_Measurement-_Technique/links/00b4953b5faa7d3304000000.pdf [retrieved on Jul. 15, 2016] dated Jan. 1, 1993, 9 pages.
European Extended Search Report in related EP Application No. 16173429.8, dated Dec. 1, 2016, 8 pages [Only new references cited: US 2013/0038881 was previously cited].
Extended European Search Report in related EP Application No. 16175410.0, dated Dec. 13, 2016, 5 pages.
European Extended Search Report in related EP Application No. 16190017.0, dated Jan. 4, 2017, 6 pages.
Padzensky, Ron; "Augmera; Gesture Control", dated Apr. 18, 2015, 15 pages [Examiner Cited Art in Office Action dated Jan. 20, 2017 in related Application.].
Grabowski, Ralph; "New Commands in AutoCADS 2010: Part 11 Smoothing 3D Mesh Objects" dated 2011 (per examiner who cited reference), 6 pages, [Examiner Cited Art in Office Action dated Jan. 20, 2017 in related Application.].
Theodoropoulos, Gabriel; "Using Gesture Recognizers to Handle Pinch, Rotate, Pan, Swipe, and Tap Gestures" dated Aug. 25, 2014, 34 pages, [Office Action dated Jan. 20, 2017 in related Application.].
European Examination report in related EP Application No. 14181437.6, dated Feb. 8, 2017, 5 pages [References have been previously cited].
Wikipedia, "Microlens", Downloaded from https://en.wikipedia.org/wiki/Microlens, pages 3. {Feb. 9, 2017 Final Office Action in related matter}.
Fukaya et al., "Characteristics of Speckle Random Pattern and Its Applications", pp. 317-327, Nouv. Rev. Optique, t.6, n.6. (1975) {Feb. 9, 2017 Final Office Action in related matter: downloaded Mar. 2, 2017 from http://iopscience.iop.org}.
European extended search report in related EP Application 16190833.0, dated Mar. 9, 2017, 8 pages [only new art has been cited; US Publication 2014/0034731 was previously cited].
United Kingdom Combined Search and Examination Report in related Application No. GB1620676.5, dated Mar. 8, 2017, 6 pages [References have been previously cited; WO2014/151746, WO2012/175731, US 2014/0313527, GB2503978].
European Exam Report in related, EP Application No. 16168216.6, dated Feb. 27, 2017, 5 pages, [References have been previously cited; WO2011/017241 and US 2014/0104413].
Thorlabs, NPL in Advisory Action dated Apr. 12, 2017, in related commonly owned application, downloaded from https://www.thorlabs.com/newgrouppage9.cfm?objectgroup_id =6430, 4 pages.
EKSMA Optics, NPL in Advisory Action dated Apr. 12, 2017, in related commonly owned application, downloaded from http://eksmaoptics.com/optical-systems/f-theta-lenses/f-theta-lens-for-1064-nm/, 2 pages.
Sill Optics, NPL in Advisory Action dated Apr. 12, 2017, in related commonly owned application, http://www.silloptics.de/1/products/sill-encyclopedia/laser-optics/f-theta-lenses/, 4 pages.
Chinese Notice of Reexamination in related Chinese Application 201520810313.3, dated Mar. 14, 2017, English computer Translation provided, 7 pages [No new art cited].

(56) References Cited

OTHER PUBLICATIONS

Extended European search report in related EP Application 16199707.7, dated Apr. 10, 2017, 15 pages.
Ulusoy et al., One-Shot Scanning using De Bruijn Spaced Grids, 2009 IEEE 12th International Conference on computer Vision Workshops, ICCV Workshops, 7 pages [Cited in EP Extended search report dated Apr. 10, 2017].
EP Search Report in related EP Application No. 17171844 dated Sep. 18, 2017. 4 pages [Only new art cited herein}.
EP Extended Search Report in related EP Applicaton No. 17174843.7 dated Oct. 17, 2017, 5 pages {Only new art cited herein}.
UK Further Exam Report in related UK Application No. GB1517842.9, dated Sep. 1, 2017, 5 pages (only new art cited herein).
European Exam Report in related EP Application No. 15176943.7, dated Apr. 12, 2017, 6 pages [Art previously cited in this matter].
European Exam Report in related EP Application No. 15188440.0, dated Apr. 21, 2017, 4 pages [No new art to cite].
European Exam Report in related EP Application No. 16152477.2, dated Jun. 20, 2017, 4 pages [No art to be cited].
European Exam Report in related EP Applciation 16172995.9, dated Jul. 6, 2017, 9 pages [No new art to be cited].
United Kingdom Search Report in related Application No. GB1700338.5, dated Jun. 30, 2017, 5 pages.
European Search Report in related EP Application No. 17175357.7, dated Aug. 17, 2017, pp. 1-7 [No new art to be cited].
Boavida et al., "Dam monitoring using combined terrestrial imaging systems", 2009 Civil Engineering Survey De/Jan 2009, pp. 33-38 {Cited in Notice of Allowance dated Sep. 15, 2017, in related matter}.
EP Extended Search Report in related EP Applicaton No. 17174843.7 dated Oct. 17, 2017, 5 pages {Only new art aited herein}.
Ralph Grabowski, "Smothing 3D Mesh Objects," New Commands in AutoCAD 2010: Part 11, Examiner Cited art in related matter Non Final Action dated May 19, 2017; 6 pages.
Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017}.
Extended European Search report in related EP Application No. 17189496.7 dated Dec. 5, 2017; 9 pages.
Extended European Search report in related EP Application No. 17190323.0 dated Jan. 19, 2018; 6 pages [Only new art cited herein].
Examination Report in related GB Application No. GB1517843.7, dated Jan. 19, 2018, 4 pages [Only new art cited herein].
Examination Report in related EP Application No. 15190315, dated Jan. 26, 2018, 6 pages [Only new art cited herein].
European Extended Search Report in related EP Application No. 17201794.9, dated Mar. 16, 2018, 10 pages [Only new art cited herein].
European extended Search Report in related Application No. 17207882.6 dated Apr. 26, 2018, 10 pages.
European Extended Search Report in related EP Application 17205030.4, dated Mar. 22, 2018, 8 pages.
European Exam Report in related EP Application 16172995.9, dated Mar. 15, 2018, 7 pages (Only new art cited herein).
United Kingdom Combined Search and Examination Report dated Mar. 21, 2018, 5 pages (Art has been previously cited).

\* cited by examiner

TERMINALS AND METHODS FOR DIMENSIONING OBJECTS

FIELD OF THE INVENTION

The present invention relates to imaging terminals generally, and in particular to an imaging terminals for dimensioning objects.

BACKGROUND OF THE INVENTION

In the field of transportation and shipping of goods, it can be useful to perform spatial measurements with respect to packages or other objects, e.g., goods that are stacked on a pallet or in the interior of a truck or shipping container. Packages and other objects often include barcode symbols including one or more of one dimensional (1D) barcodes, stacked 1D barcodes, and two dimensional (2D) barcodes.

U.S. Pat. No. 7,726,575 issued to Wang et al. discloses an indicia reading terminal having spatial measurement functionality. The indicia reading terminal can execute a spatial measurement mode of operation in which the indicia reading terminal can determine a dimension of an article in a field of view of the indicia reading terminal and/or determine other spatial information. In determining a dimension of an article, the indicia reading terminal can utilize setup data determined in a setup mode of operation and/or data determined utilizing the setup data.

U.S. Patent Application Publication No. 2011/0279916 by Brown et al. discloses a shaped memory alloy (SMA) actuation apparatus comprises a camera lens element supported on a support structure by a plurality of flexures for focusing or zooming.

U.S. Pat. No. 7,307,653 issued to Dutta discloses a handheld device for stabilizing an image captured by an optical lens of a micro camera integral with the handheld device. Motion sensors sense motion of the device and are used to cause movement of the micro camera to substantially compensate for the sensed movement so as to maintain a steady, focused image to be displayed by a display on the handheld device or elsewhere, such as a remote display. The micro camera is moved by one or more motion actuators which move the camera in a horizontal plane substantially perpendicular to an axis of the lens of the camera and/or move the camera so as to pivot the lens axis. The actuator may include a piezo actuator, a MEMS actuator, a shaped memory alloy (SMA) which changes in length in response to an electrical bias, and other types of electromechanical actuators.

There is a need for further imaging terminals generally, and in particular to an imaging terminal for dimensioning objects.

SUMMARY OF THE INVENTION

In a first aspect, the present invention provides a terminal for measuring at least one dimension of an object. The terminal includes at least one imaging subsystem and an actuator. The at least one imaging subsystem includes an imaging optics assembly operable to focus an image onto an image sensor array. The imaging optics assembly has an optical axis. The actuator is operably connected to the at least one imaging subsystem for moving an angle of the optical axis relative to the terminal. The terminal is adapted to obtain first image data of the object and is operable to determine at least one of a height, a width, and a depth dimension of the object based on effecting the actuator to change the angle of the optical axis relative to the terminal to align the object in second image data with the object in the first image data, the second image data being different from the first image data.

In a second aspect, the present invention provides a method for measuring at least one dimension of an object. The method includes obtaining a first image data of the object, moving an optical axis of at least one imaging subsystem to align second image data of the object with the first image data, the second image data being different from the first image data, and determining at least one of a height, a width, and a depth dimension of the object based on moving the optical axis of the at least one imaging subsystem to align the image of the object in the second image data with the image of the object in the first image data.

BRIEF DESCRIPTION OF THE DRAWINGS

The subject matter which is regarded as the invention is particularly pointed out and distinctly claimed in the concluding portion of the specification. The invention, however, may best be understood by reference to the following detailed description of various embodiments and the accompanying drawings in which:

DETAILED DESCRIPTION OF THE INVENTION

Figure 1:
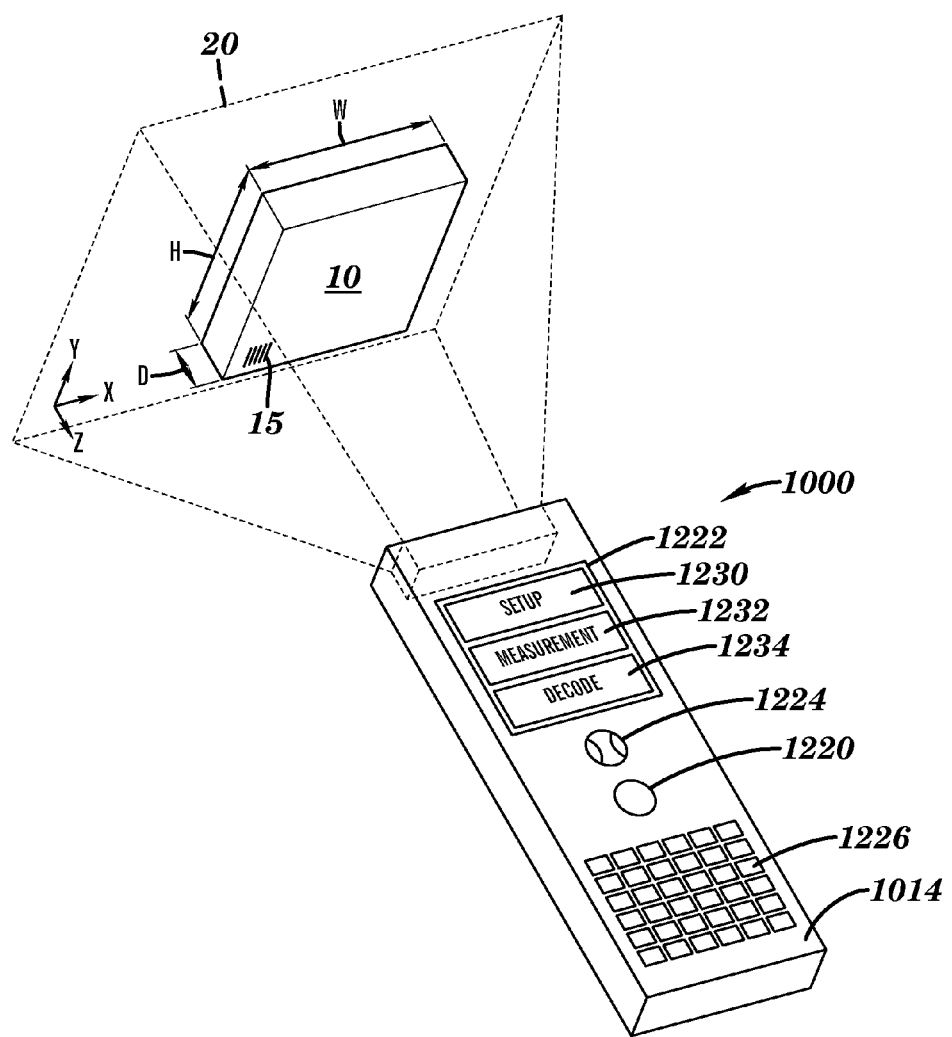
FIG. 1 is a schematic physical form view of one embodiment of a terminal in accordance with aspects of the present invention.

FIG. 1 illustrates one embodiment of a terminal 1000 operable for measuring at least one dimension of an object 10 in accordance with aspects of the present invention. For example, terminal 1000 may determine a height H, a width W, and a depth D of an object. In addition, terminal 1000 may be operable to read a decodable indicia 15 such as a barcode disposed on the object. For example, the terminal may be suitable for shipping applications in which an object such as a package is subject to shipping from one location to another location. The dimension (dimensioning) information and other measurement (e.g., volume measurement information) respecting object 10 may be used, e.g., to determine a cost for shipping a package or for determining a proper arrangement of the package in a shipping container.

In one embodiment, a terminal in accordance with aspects of the present invention may include at least one or more imaging subsystems such as one or more camera modules and an actuator to adjust the pointing angle of the one or more camera modules to provide true stereo imaging. The terminal may be operable to attempt to determine at least one of a height, a width, and a depth based on effecting the adjustment of the pointing angle of the one or more camera modules.

For example, a terminal in accordance with aspects of the present invention may include at least one or more imaging subsystems such as camera modules and an actuator based on wires of nickel-titanium shape memory alloy (SMA) and an associated control and heating ASIC (application-specific integrated circuit) to adjust the pointing angle of the one or more camera modules to provide true stereo imaging. Using true stereo imaging, the distance to the package can be determined by measuring the amount of drive current or voltage drop across the SMA actuator. The terminal may be operable to attempt to determine at least one of a height, a width, a depth, based on the actuator effecting the adjustment of the pointing angle of the one or more camera modules, the measured distance, and the obtained image of the object.

With reference still to FIG. 1, terminal 1000 in one embodiment may include a trigger 1220, a display 1222, a pointer mechanism 1224, and a keyboard 1226 disposed on a common side of a hand held housing 1014. Display 1222 and pointer mechanism 1224 in combination can be regarded as a user interface of terminal 1000. Terminal 1000 may incorporate a graphical user interface and may present buttons 1230, 1232, and 1234 corresponding to various operating modes such as a setup mode, a spatial measurement mode, and an indicia decode mode, respectively. Display 1222 in one embodiment can incorporate a touch panel for navigation and virtual actuator selection in which case a user interface of terminal 1000 can be provided by display 1222. Hand held housing 1014 of terminal 1000 can in another embodiment be devoid of a display and can be in a gun style form factor. The terminal may be an indicia reading terminal and may generally include hand held indicia reading terminals, fixed indicia reading terminals, and other terminals. Those of ordinary skill in the art will recognize that the present invention is applicable to a variety of other devices having an imaging subassembly which may be configured as, for example, mobile phones, cell phones, satellite phones, smart phones, telemetric devices, personal data assistants, and other devices.

Figure 2:
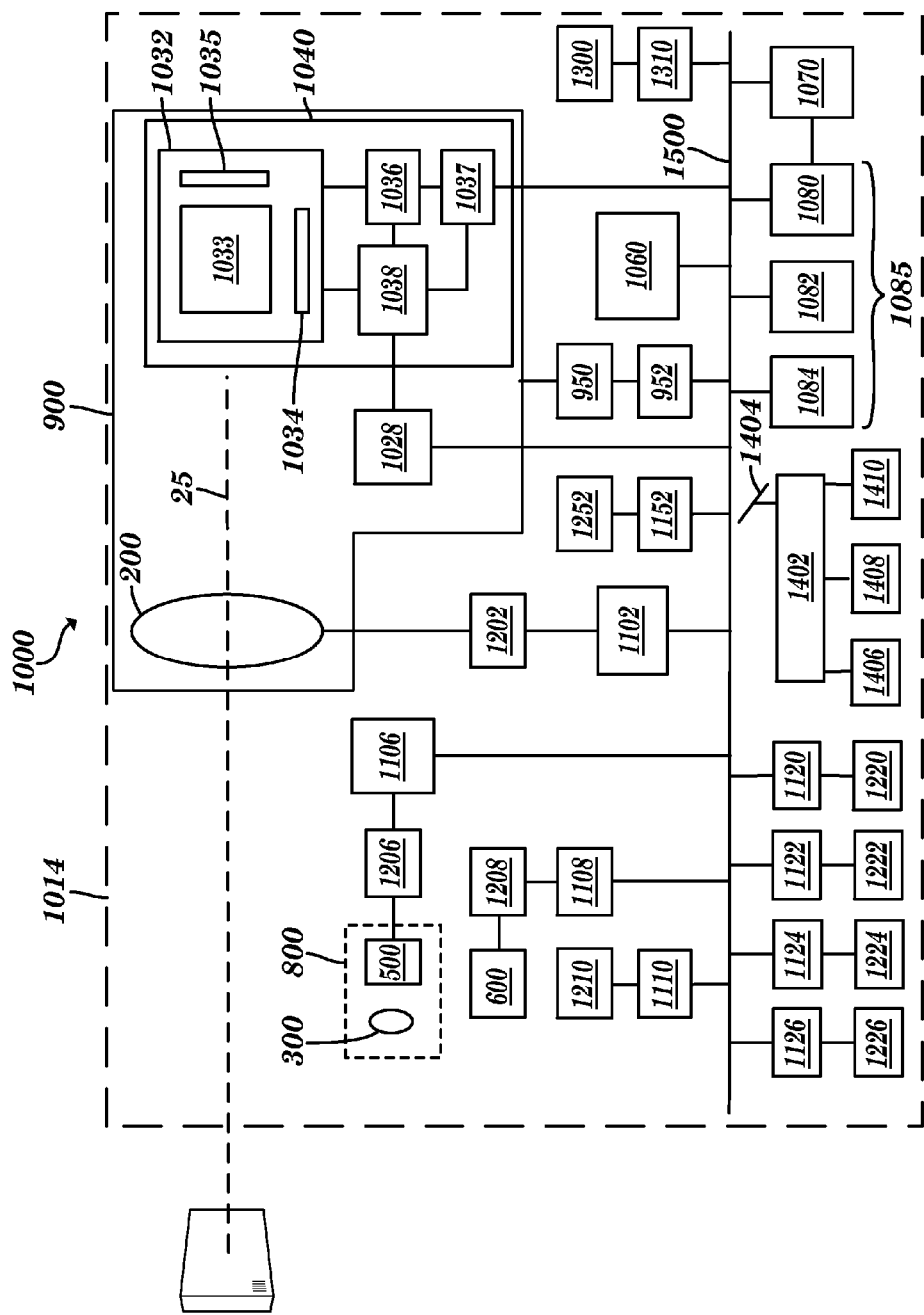
FIG. 2 is a block diagram of the terminal of FIG. 1.

FIG. 2 depicts a block diagram of one embodiment of terminal 1000. Terminal 1000 may generally include at least one imaging subsystem 900, an illumination subsystem 800, hand held housing 1014, a memory 1085, and a processor 1060. Imaging subsystem 900 may include an imaging optics assembly 200 operable for focusing an image onto an image sensor pixel array 1033. An actuator 950 is operably connected to imaging subsystem 900 for moving imaging subsystem 900 and operably connected to processor 1060 (FIG. 2) via interface 952. Hand held housing 1014 may encapsulate illumination subsystem 800, imaging subsystem 900, and actuator 950. Memory 1085 is capable of storing and or capturing a frame of image data, in which the frame of image data may represent light incident on image sensor array 1033. After an exposure period, a frame of image data can be read out. Analog image signals that are read out of array 1033 can be amplified by gain block 1036 converted into digital form by analog-to-digital converter 1037 and sent to DMA unit 1070. DMA unit 1070, in turn, can transfer digitized image data into volatile memory 1080. Processor 1060 can address one or more frames of image data retained in volatile memory 1080 for processing of the frames for determining one or more dimensions of the object and/or for decoding of decodable indicia represented on the object.

Figure 3:
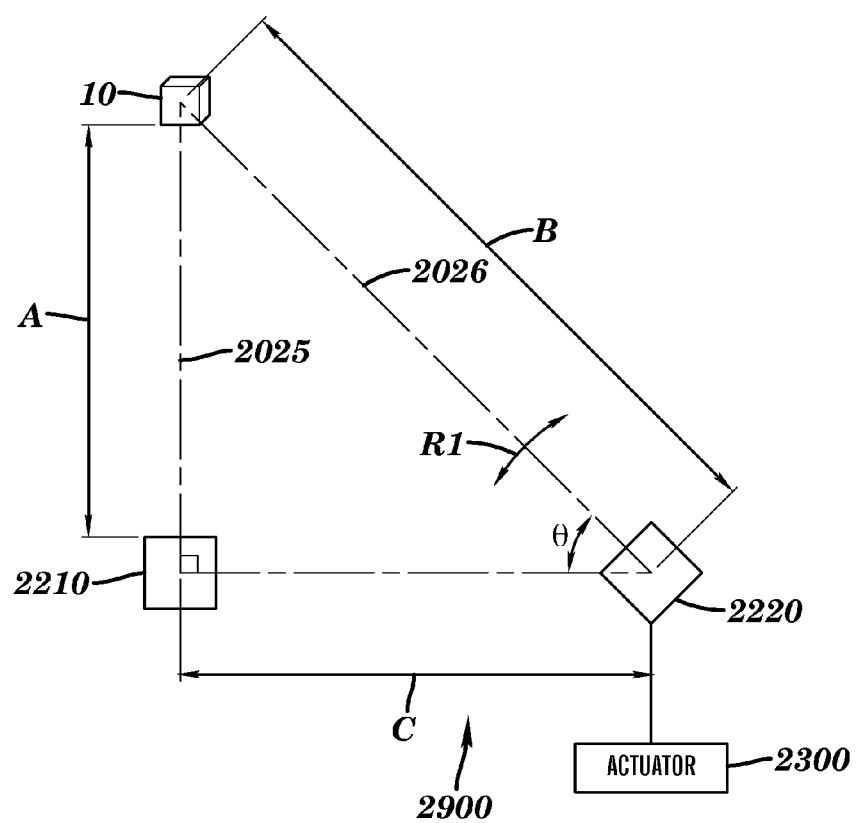
FIG. 3 is a diagrammatic illustration of one embodiment of a imaging subsystem for use in the terminal of FIG. 1.

FIG. 3 illustrates one embodiment of the imaging subsystem employable in terminal 1000. In this exemplary embodiment, an imaging subsystem 2900 may include a first fixed imaging subsystem 2210, and a second movable imaging subsystem 2220. An actuator 2300 may be operably connected to imaging subsystem 2220 for moving imaging subsystem 2220. First fixed imaging subsystem 2210 is operable for obtaining a first image or frame of image data of the object, and second movable imaging subsystem 2220 is operable for obtaining a second image or frame of image data of the object. Actuator 2300 is operable to bring the second image into alignment with the first image as described in greater detail below. In addition, either the first fixed imaging subsystem 2210 or the second movable imaging subsystem 2220 may also be employed to obtain an image of decodable indicia 15 (FIG. 1) such as a decodable barcode.

FIG. 3-7 illustrate one embodiment of the terminal in a spatial measurement mode. For example, a spatial measurement mode may be made active by selection of button 1232 (FIG. 1). In a spatial measurement operating mode, terminal 1000 (FIG. 1) can perform one or more spatial measurements, e.g., measurements to determine one or more of a terminal to target distance (z distance) or a dimension (e.g., h, w, d) of an object or another spatial related measurement (e.g., a volume measurement, a distance measurement between any two points).

Figure 4:
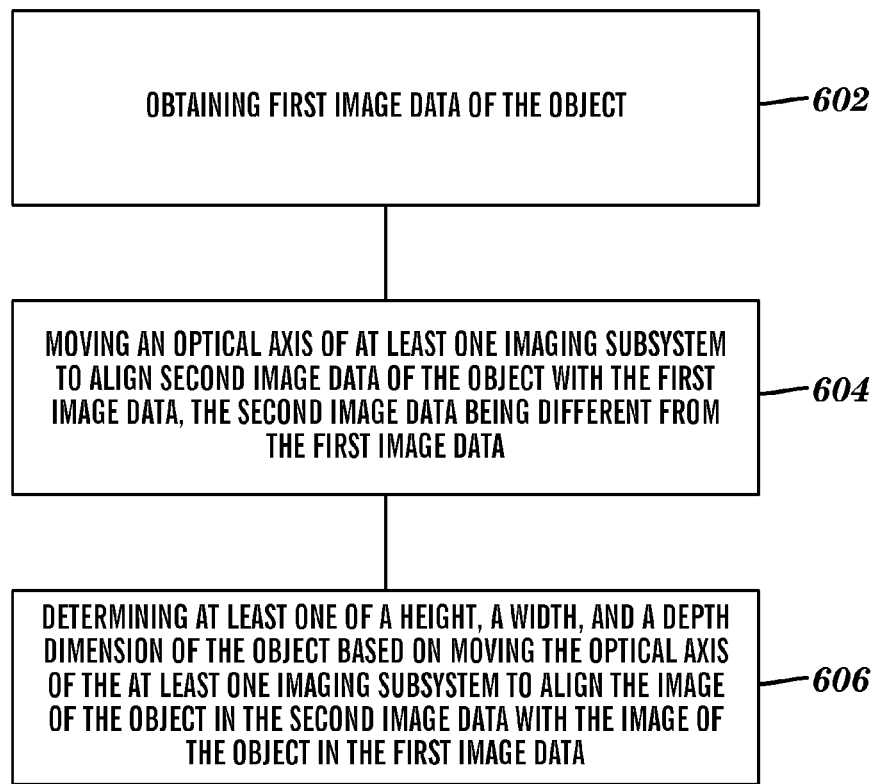
FIG. 4 is a flowchart illustrating one embodiment of a method for measuring at least one dimension of an object using the terminal of FIG. 1.
Figure 5:
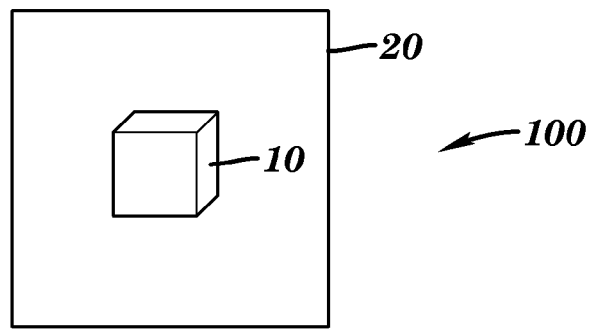
FIG. 5 is an illustration of a first image of the object obtained using the fixed imaging subsystem of FIG. 3.
Figure 6:
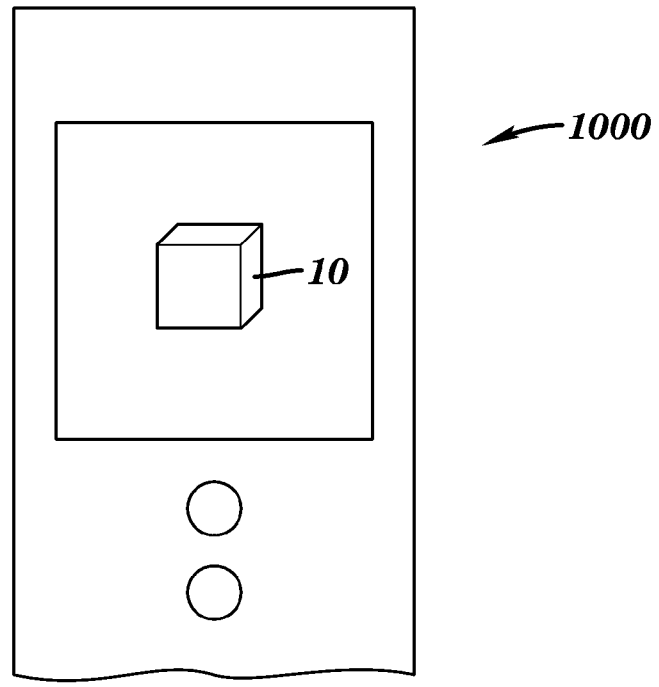
FIG. 6 is a view of the terminal of FIG. 1 illustrating on the display the object disposed in the center of the display for use in obtaining the first image of FIG. 5.
Figure 7:
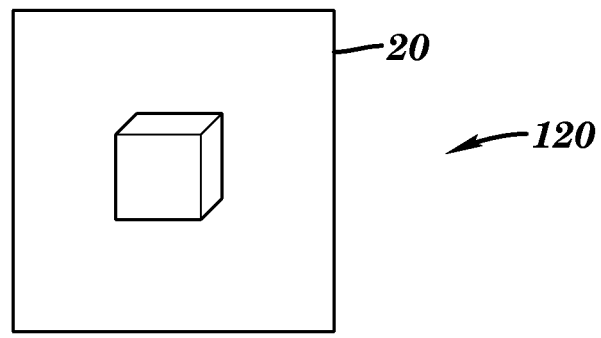
FIG. 7 is a second aligned image of the object obtained using the movable imaging subsystem of FIG. 3.

Initially, at block 602 as shown in FIG. 4, terminal 10 may obtain or capture first image data, e.g., at least a portion of a frame of image data such as a first image 100 using fixed imaging subsystem 2210 (FIG. 3) within a field of view 20 (FIGS. 1 and 5). For example, a user may operate terminal 1000 to display object 10 using fixed imaging subsystem 2210 (FIG. 3) in the center of display 1222 as shown in FIG. 6. Terminal 1000 can be configured so that block 602 is executed responsively to trigger 1220 (FIG. 1) being initiated. With reference again to FIG. 3, imaging the object generally in the center of the display results when the object is aligned with an imaging axis or optical axis 2025 of fixed imaging subsystem 2210. For example, the optical axis may be a line or an imaginary line that defines the path along which light propagates through the system. The optical axis may passes through the center of curvature of the imaging optics assembly and may be coincident with a mechanical axis of imaging subsystem 2210.

With reference again to FIG. 4, at 604, terminal 1000 may be adapted to move an optical axis 2026 (FIG. 3) of movable imaging subsystem 2220 (FIG. 3) using actuator 2300 (FIG. 3) to align second image data, e.g., at least a portion of a frame of image data such as a second image 120 using movable imaging subsystem 2220 (FIG. 3) within a field of view 20 (FIGS. 1 and 7) with the first image data. As shown in FIG. 3, optical axis 2026 of imaging subsystem 2220 may be pivoted, tilted or deflected, for example in the direction of double-headed arrow R1 in response to actuator 2300 to align the second image of the object with the object in the first image.

For example, the terminal may include a suitable software program employing a subtraction routine to determine when the image of the object in the second image data is aligned with the object in the first image data. The closer the aligned images of the object are, the resulting subtraction of the two images such as subtracting the amplitude of the corresponding pixels of the imagers will become smaller as the images align and match. The entire images of the object may be compared, or a portion of the images of the object may be compared. Thus, the better the images of the object are aligned, the smaller the subtracted difference will be.

A shown in FIG. 4, at 606, an attempt to determine at least one of a height, a width, and a depth dimension of the object is made based on moving the optical axis of the movable imaging subsystem to align the image of the object in the second image data with the image of the object in the first image data. For example, the position of the angle of the optical axis is related to the distance between the terminal and the object, and the position of the angle of the optical axis and/or the distance between the terminal and the object may be used in combination with the number of pixels used for imaging the object in the image sensor array to the determine the dimensions of the object.

With reference again to FIG. 3, the angle of the optical axis of the movable imaging subsystem relative to the terminal is related to the distance from the movable imaging subsystem (e.g., the front of the images sensor array) to the object (e.g., front surface, point, edge, etc), and the angle of the optical axis of the movable imaging subsystem relative to the terminal is related to the distance from the fixed imaging subsystem (e.g., the front of the images sensor array) to the object (e.g., front surface, point, edge, etc).

For example, the relationship between an angle $\Theta$ of the optical axis of the movable imaging subsystem relative to the terminal, a distance A from the fixed imaging subsystem to the object, and a distance C between the fixed imaging subsystem and the movable imaging subsystem may be expressed as follows:

$$\tan \Theta = A/C.$$

The relationship between angle $\Theta$ of the optical axis of the movable imaging subsystem relative to the terminal, a distance B from the fixed imaging subsystem to the object, and distance C between the fixed imaging subsystem and the movable imaging subsystem may be expressed as follows:

$$\cos \Theta = C/B.$$

Figure 8:
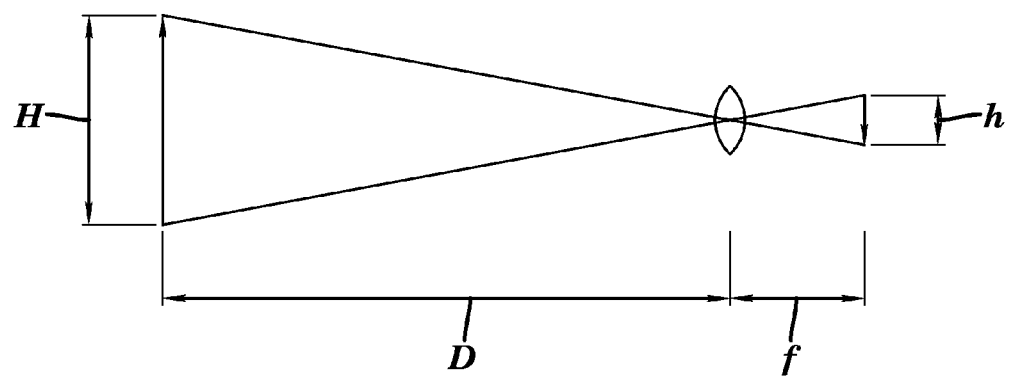
FIG. 8 is a diagrammatic illustration of the geometry between an object and the image of the object on an image sensor array.

With reference to FIG. 8, the actual size of an object relative to the size of the object observed on an image sensor array may be generally defined as follows:

$$\frac{h}{f} = \frac{H}{D}$$

where h is a dimension of the object (such as height) of the object on the image sensor array, f is focal length of the imaging optics lens, H is a dimension of the actual object (such as height), and D is distance from the object to the imaging optic lens.

With reference to measuring, for example a height dimension, knowing the vertical size of the imaging sensor (e.g., the height in millimeters or inches) and number of pixels vertically disposed along the imaging sensor, the height of the image of the object occupying a portion of the imaging sensor would be related to a ratio of the number of pixels forming the imaged object to the total pixels disposed vertically along the image sensor.

For example, a height of an observed image on the imaging sensor may be determined as follows:

$$h = \frac{\text{observed object image height (pixels)}}{\text{height of sensor (pixels)}} \times \text{height of sensor (e.g. in inches)}$$

In one embodiment, an actual height measurement may be determined as follows:

$$H = \frac{D \times h}{f}$$

For example, where an observed image of the object is 100 pixels high, and a distance D is 5 feet, the actual object height would be greater than when the observed image of the object is 100 pixels high, and a distance D is 2 feet. Other actual dimensions (e.g., width and depth) of the object may be similarly obtained.

From the present description, it will be appreciated that the terminal maybe setup using a suitable setup routine that is accessed by a user or by a manufacturer for coordinating the predetermined actual object to dimensioning at various distances, e.g., coordinate a voltage or current reading required to effect the actuator to align the object in the second image with the image of the object in the first image, to create a lookup table. Alternatively, suitable programming or algorithms employing, for example, the relationships described above, may be employed to determine actual dimensions based on the number of pixels observed on the imaging sensor. In addition, suitable edge detection or shape identifier algorithms or processing may be employed with analyzing standard objects, e.g., boxes, cylindrical tubes, triangular packages, etc., to determine and/or confirm determined dimensional measurements.

Figure 9:
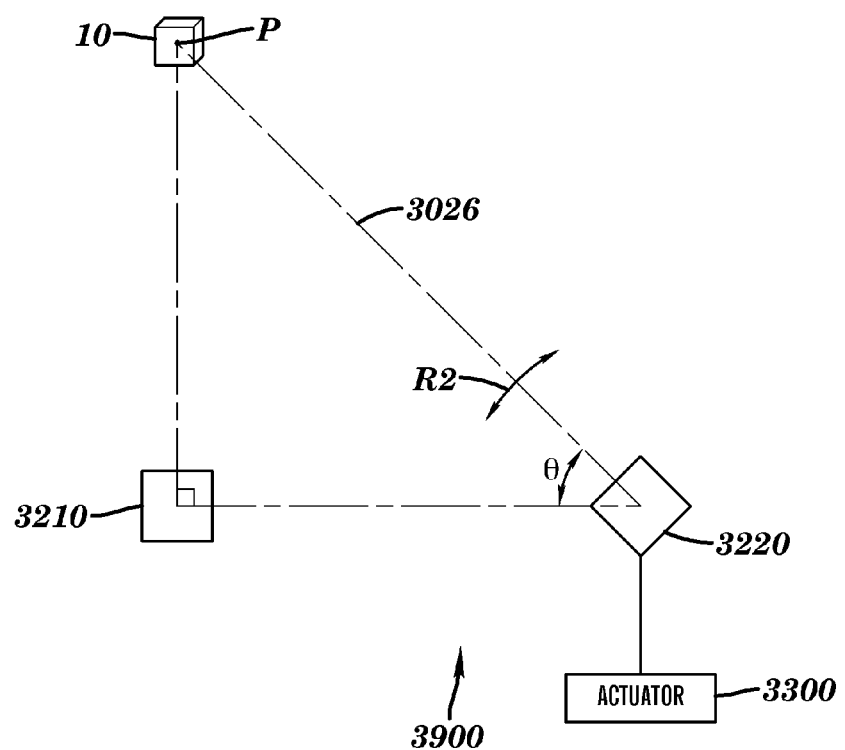
FIG. 9 is a diagrammatic illustration of another embodiment of a imaging subsystem for use in the terminal of FIG. 1, which terminal may include an aimer.

FIG. 9 illustrates another embodiment of an imaging subsystem employable in terminal 1000 (FIG. 1). Alignment of the second image may also be accomplished using a projected image pattern P from an aimer onto the object to determine the dimensions of the object. In activating the terminal, an aimer such as a laser aimer may project an aimer pattern onto the object. The projected aimer pattern may be a dot, point, or other pattern. The imaged object with the dot in the second image may be aligned, e.g., the actuator effective to move the movable imaging subsystem so that the laser dot on the imaged second image aligns with the laser dot in the first image. The aimer pattern may be orthogonal lines or a series of dots that a user may be able to align adjacent to or along one or more sides or edges such as orthogonal sides or edges of the object.

In this exemplary embodiment, an imaging subsystem 3900 may include a first fixed imaging subsystem 3210, and a second movable imaging subsystem 3220. In addition, terminal 1000 (FIG. 1) may include an aiming subsystem 600 (FIG. 2) for projecting an aiming pattern onto the object, in accordance with aspects of the present invention. An actuator 3300 may be operably attached to imaging subsystem 3220 for moving imaging subsystem 3220. First fixed imaging subsystem 3210 is operable for obtaining a first image of the object having an aimer pattern P such as a point or other pattern. Second movable imaging subsystem 3220 is operable for obtaining a second image of the object. Actuator 3300 is operable to bring the second image into alignment with the first image be aligning point P in the second image with point p in the second image. For example, an optical axis 3026 of imaging subsystem 3220 may be pivoted, tilted or deflected, for example in the direction of double-headed arrow R2 in response to actuator 3300 to align the second image of the abject with the object in the first image. In addition, either the first fixed imaging subsystem 3210, or the second movable imaging subsystem 3220 may also be employed to obtain an image of decodable indicia 15 (FIG. 1) such as a decodable barcode.

Figure 10:
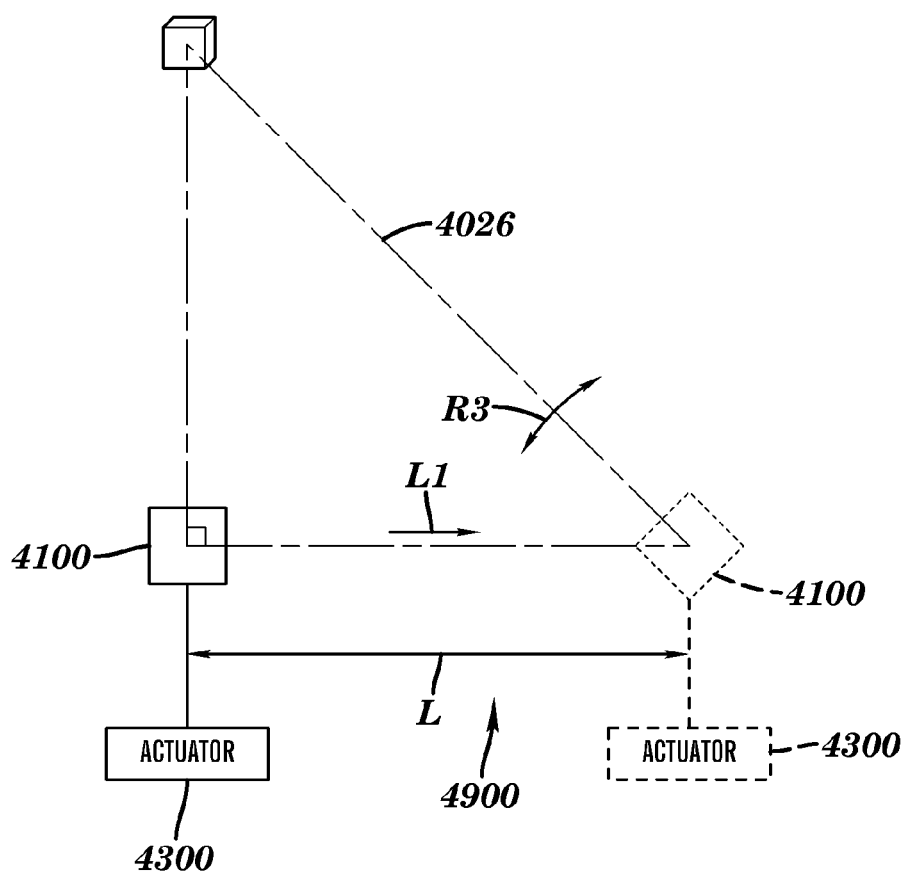
FIG. 10 is a diagrammatic illustration of another embodiment of a single movable imaging subsystem and actuator for use in the terminal of FIG. 1.

FIG. 10 illustrates another embodiment of an imaging subsystem employable in terminal 1000 (FIG. 1). In this embodiment, an imaging subsystem 4900 may be employed in accordance with aspects of the present invention. For example, an imaging subsystem 4900 may include a movable imaging subsystem 4100. An actuator 4300 may be operably attached to imaging subsystem 4100 for moving imaging subsystem 4100 from a first position to a second position remote from the first position. Movable imaging subsystem 4100 is operable for obtaining a first image of the object at the first position or orientation, and after taking a first image, moved or translate the movable imaging subsystem to a second location or orientation such as in the direction of arrow L1 using actuator 4300 to provide a distance L between the first position and the second position prior to aligning the object and obtaining a second image of the object. Actuator 4300 is also operable to bring the second image into alignment with the first image. For example, an optical axis 4026 of imaging subsystem 4100 may be pivoted, tilted or deflected, for example in the direction of double-headed arrow R3 in response to actuator 4100 to align the second image of the object with the object in the first image. As noted above, terminal 1000 (FIG. 1) may include an aiming subsystem 600 (FIG. 2) for projecting an aiming pattern onto the object in combination with imaging subsystem 4900. In addition, the movable imaging subsystem 4100 may also be employed to obtain an image of decodable indicia 15 (FIG. 1) such as a decodable barcode.

From the present description of the various imaging subsystems and actuators, it will be appreciated that the second aligned image be performed in an operable time after the first image so that the effect of the user holding and moving the terminal when obtaining the images or the object moving when obtaining the image does not result in errors in determining the one or more dimensions of the object. It is desirable minimize the time delay between the first image and the second aligned image. For example, it may be suitable that the images be obtained within about 0.5 second or less, or possibly within about 1/8 second or less, about 1/16 second or less, or about 1/32 second or less.

With reference to FIGS. 3, 8, and 9, the actuators employed in the various embodiments may comprise one or more actuators which are positioned in the terminal to move the movable imagining subsystem in accordance with instructions received from processor 1060 (FIG. 2). Examples of a suitable actuator include a shaped memory alloy (SMA) which changes in length in response to an electrical bias, a piezo actuator, a MEMS actuator, and other types of electromechanical actuators. The actuator may allow for moving or pivoting the optical axis of the imaging optics assembly, or in connection with the actuator in FIG. 10, also moving the imaging subsystem from side-to-side along a line or a curve.

Figure 11:
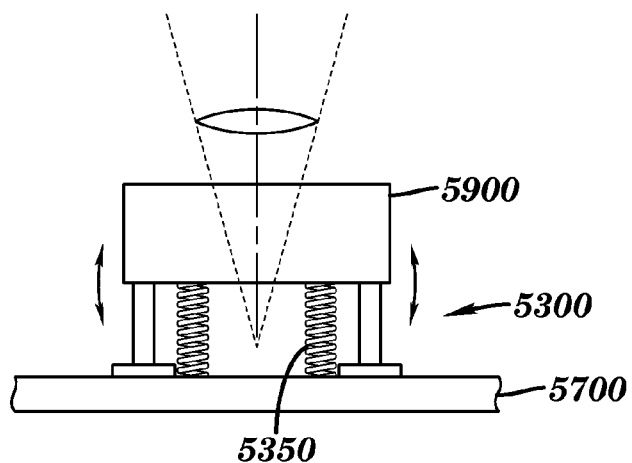
FIG. 11 is an elevational side view of one implementation of an imaging subsystem and actuator for use in the terminal of FIG. 1.
Figure 12:
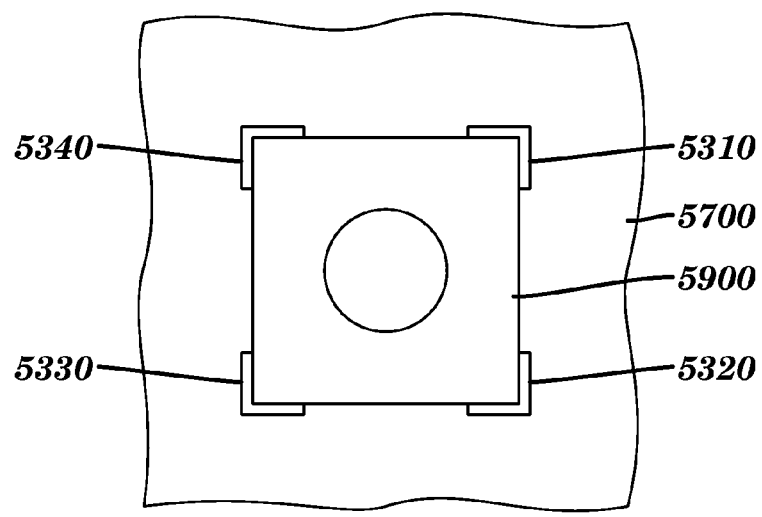
FIG. 12 is a top view of the imaging subsystem and actuator of FIG. 11.

As shown in FIGS. 11 and 12, an actuator 5300 may comprise four actuators 5310, 5320, 5330, and 5430 disposed beneath each corner of an imaging subsystem 5900 to movable support the imaging subsystem on a circuit board 5700. The actuators may be selected so that they are capable of compressing and expanding and, when mounted to the circuit board, are capable of pivoting the imaging subsystem relative to the circuit board. The movement of imaging subsystem by the actuators may occur in response to a signal from the processor. The actuators may employ a shaped memory alloy (SMA) member which cooperates with one or more biasing elements 5350 such as springs, for operably moving the imaging subsystem. In addition, although four actuators are shown as being employed, more or fewer than four actuators may be used. The processor may process the comparison of the first image to the observed image obtained from the movable imaging subsystem, and based on the comparison, determine the required adjustment of the position of the movable imaging subsystem to align the object in the second image with the obtained image in the first obtained image.

In addition, the terminal may include a motion sensor 1300 (FIG. 2) operably connected to processor 1060 (FIG. 2) via interface 1310 (FIG. 2) operable to remove the effect of shaking due to the user holding the terminal at the same time as obtaining the first image and second aligned image which is used for determine one of more dimensions of the object as described above. A suitable system for use in the above noted terminal may include the image stabilizer for a microcamera disclosed in U.S. Pat. No. 7,307,653 issued to Dutta, the entire contents of which are incorporated herein by reference.

The imaging optics assembly may employ a fixed focus imaging optics assembly. For example, the optics may be focused at a hyperfocal distance so that objects in the images from some near distance to infinity will be sharp. In the present invention, the imaging optics assembly may be focused at a distance of 15 inches or greater, in the range of 3 or 4 feet distance, or at other distances. Alternatively, the imaging optics assembly may comprise an autofocus lens. The present invention may includes a suitable shape memory alloy actuator apparatus for controlling an imaging subassembly such as a microcamera disclosed in U.S. Pat. No. 7,974,025 by Topliss, the entire contents of which are incorporated herein by reference.

From the present description, it will be appreciated that the present invention may be operably employed to separately obtain images and dimensions of the various sides of an object, e.g., two or more of a front elevational view, a side elevational view, and a top view, may be separately obtained by a user, similar to measuring an object as one would with a ruler.

The present invention may includes a suitable autofocusing microcamera such as a microcamera disclosed in U.S. Patent Application Publication No. 2011/0279916 by Brown et al., the entire contents of which are incorporated herein by reference.

In addition, it will be appreciated that the described imaging subsystems in the embodiments shown in FIGS. 3, 9, and 10, may employ fluid lenses or adaptive lenses as know in the art. For example, a fluid lens or adaptive lens may comprise an interface between two fluids having dissimilar optical indices. The shape of the interface can be changed by the application of external forces so that light passing across the interface can be directed to propagate in desired directions. As a result, the optical characteristics of a fluid lens, such its focal length and the orientation of its optical axis, can be changed. With use of a fluid lens or adaptive lens, for example, an actuator may be operable to apply pressure to the fluid to change the shape of the lens. In another embodiments, an actuator may be operable to apply a dc voltage across a coating of the fluid to decrease its water repellency in a process called electrowetting to change the shape of the lens. The present invention may includes a suitable fluid lens as disclosed in U.S. Pat. No. 8,027,096 issued to Feng et al., the entire contents of which are incorporated herein by reference.

Figure 13:
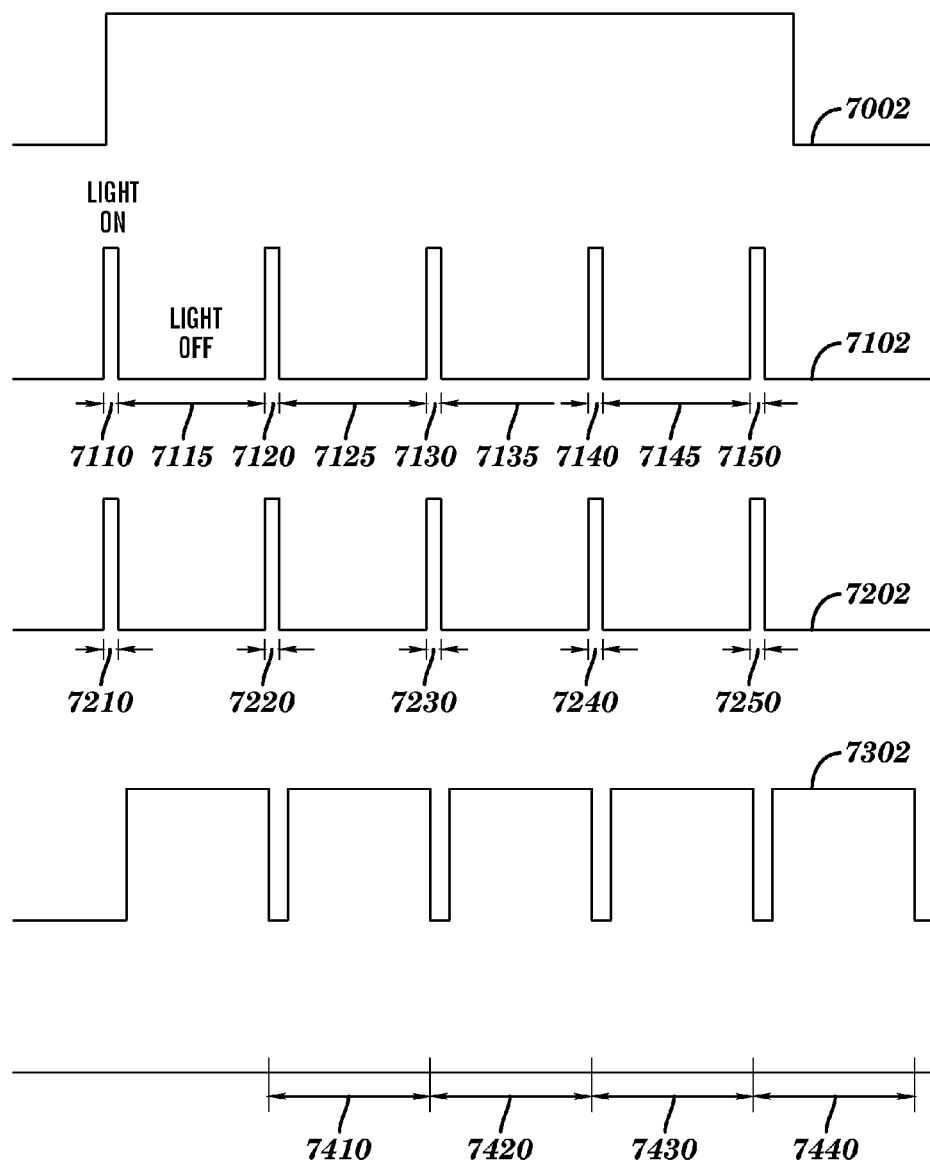
FIG. 13 is a timing diagram illustrating one embodiment for use in determining one or more dimensions and for decoding a decodable performed by the indicia reading terminal of FIG. 1.

With reference to FIG. 13, a timing diagram may be employed for obtaining a first image of the object for use in determining one or more dimensions as described above, and also used for decoding a decodable indicia disposed on an object using for example, the first imaging subassembly. At the same time or generally simultaneously after activation of the first imaging subassembly, the movable subassembly and actuator may be activated to determine one or more dimensions as described above. For example, the first frame of image data of the object using the first imaging subassembly may be used in combination with the aligned image of the object using the movable imaging subsystem.

A signal 7002 may be a trigger signal which can be made active by actuation of trigger 1220 (FIG. 1), and which can be deactivated by releasing of trigger 1220 (FIG. 1). A trigger signal may also become inactive after a time out period or after a successful decode of a decodable indicia.

A signal 7102 illustrates illumination subsystem 800 (FIG. 2) having an energization level, e.g., illustrating an illumination pattern where illumination or light is alternatively turned on and off. Periods 7110, 7120, 7130, 7140, and 7150 illustrate where illumination is on, and periods 7115, 7125, 7135, and 7145 illustrate where illumination is off.

A signal 7202 is an exposure control signal illustrating active states defining exposure periods and inactive states intermediate the exposure periods for an image sensor of a terminal. For example, in an active state, an image sensor array of terminal 1000 (FIG. 1) is sensitive to light incident thereon. Exposure control signal 7202 can be applied to an image sensor array of terminal 1000 (FIG. 1) so that pixels of an image sensor array are sensitive to light during active periods of the exposure control signal and not sensitive to light during inactive periods thereof. During exposure periods 7210, 7220, 7230, 7240, and 7250, the image sensor array of terminal 1000 (FIG. 1) is sensitive to light incident thereon.

A signal 7302 is a readout control signal illustrating the exposed pixels in the image sensor array being transferred to memory or secondary storage in the imager so that the imager may be operable to being ready for the next active portion of the exposure control signal. In the timing diagram of FIG. 13, period 7410 may be used in combination with movable imaging subsystem to determine one or more dimensions as described above. In addition, in the timing diagram of FIG. 13, periods 7410, 7420, 7430, 7440, and 7450 are periods in which processer 1060 (FIG. 2) may process one or more frames of image data. For example, periods 7410, 7420, 7430, and 7440 may correspond to one or more attempts to decode decodable indicia in which the image resulted during periods when indicia reading terminal 1000 (FIG. 1) was illuminating the decodable indicia.

With reference again to FIG. 2, indicia reading terminal 1000 may include an image sensor 1032 comprising multiple pixel image sensor array 1033 having pixels arranged in rows and columns of pixels, associated column circuitry 1034 and row circuitry 1035. Associated with the image sensor 1032 can be amplifier circuitry 1036 (amplifier), and an analog to digital converter 1037 which converts image information in the form of analog signals read out of image sensor array 1033 into image information in the form of digital signals. Image sensor 1032 can also have an associated timing and control circuit 1038 for use in controlling, e.g., the exposure period of image sensor 1032, gain applied to the amplifier 1036, etc. The noted circuit components 1032, 1036, 1037, and 1038 can be packaged into a common image sensor integrated circuit 1040. Image sensor integrated circuit 1040 can incorporate fewer than the noted number of components. Image sensor integrated circuit 1040 including image sensor array 1033 and imaging lens assembly 200 can be incorporated in hand held housing 1014.

In one example, image sensor integrated circuit 1040 can be provided e.g., by an MT9V022 (752×480 pixel array) or an MT9V023 (752×480 pixel array) image sensor integrated circuit available from Aptina Imaging (formerly Micron Technology, Inc.). In one example, image sensor array 1033 can be a hybrid monochrome and color image sensor array having a first subset of monochrome pixels without color filter elements and a second subset of color pixels having color sensitive filter elements. In one example, image sensor integrated circuit 1040 can incorporate a Bayer pattern filter, so that defined at the image sensor array 1033 are red pixels at red pixel positions, green pixels at green pixel positions, and blue pixels at blue pixel positions. Frames that are provided utilizing such an image sensor array incorporating a Bayer pattern can include red pixel values at red pixel positions, green pixel values at green pixel positions, and blue pixel values at blue pixel positions. In an embodiment incorporating a Bayer pattern image sensor array, processor 1060 prior to subjecting a frame to further processing can interpolate pixel values at frame pixel positions intermediate of green pixel positions utilizing green pixel values for development of a monochrome frame of image data. Alternatively, processor 1060 prior to subjecting a frame for further processing can interpolate pixel values intermediate of red pixel positions utilizing red pixel values for development of a monochrome frame of image data. Processor 1060 can alternatively, prior to subjecting a frame for further processing interpolate pixel values intermediate of blue pixel positions utilizing blue pixel values. An imaging subsystem of terminal 1000 can include image sensor 1032 and lens assembly 200 for focusing an image onto image sensor array 1033 of image sensor 1032.

In the course of operation of terminal 1000, image signals can be read out of image sensor 1032, converted, and stored into a system memory such as RAM 1080. Memory 1085 of terminal 1000 can include RAM 1080, a nonvolatile memory such as EPROM 1082 and a storage memory device 1084 such as may be provided by a flash memory or a hard drive memory. In one embodiment, terminal 1000 can include processor 1060 which can be adapted to read out image data stored in memory 1080 and subject such image data to various image processing algorithms. Terminal 1000 can include a direct memory access unit (DMA) 1070 for routing image information read out from image sensor 1032 that has been subject to conversion to RAM 1080. In another embodiment, terminal 1000 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 1032 and RAM 1080 are within the scope and the spirit of the invention.

Reference still to FIG. 2 and referring to further aspects of terminal 1000, imaging lens assembly 200 can be adapted for focusing an image of decodable indicia 15 located within a field of view 20 on the object onto image sensor array 1033. A size in target space of a field of view 20 of terminal 1000 can be varied in a number of alternative ways. A size in target space of a field of view 20 can be varied, e.g., by changing a terminal to target distance, changing an imaging lens assembly setting, changing a number of pixels of image sensor array 1033 that are subject to read out. Imaging light rays can be transmitted about an imaging axis. Lens assembly 200 can be adapted to be capable of multiple focal lengths and multiple planes of optimum focus (best focus distances).

Terminal 1000 may include illumination subsystem 800 for illumination of target, and projection of an illumination pattern (not shown). Illumination subsystem 800 may emit light having a random polarization. The illumination pattern, in the embodiment shown can be projected to be proximate to but larger than an area defined by field of view 20, but can also be projected in an area smaller than an area defined by a field of view 20. Illumination subsystem 800 can include a light source bank 500, comprising one or more light sources. Light source assembly 800 may further include one or more light source banks, each comprising one or more light sources, for example. Such light sources can illustratively include light emitting diodes (LEDs), in an illustrative embodiment. LEDs with any of a wide variety of wavelengths and filters or combination of wavelengths or filters may be used in various embodiments. Other types of light sources may also be used in other embodiments. The light sources may illustratively be mounted to a printed circuit board. This may be the same printed circuit board on which an image sensor integrated circuit 1040 having an image sensor array 1033 may illustratively be mounted.

Terminal 1000 can also include an aiming subsystem 600 for projecting an aiming pattern (not shown). Aiming subsystem 600 which can comprise a light source bank can be coupled to aiming light source bank power input unit 1208 for providing electrical power to a light source bank of aiming subsystem 600. Power input unit 1208 can be coupled to system bus 1500 via interface 1108 for communication with processor 1060.

In one embodiment, illumination subsystem 800 may include, in addition to light source bank 500, an illumination lens assembly 300, as is shown in the embodiment of FIG. 2. In addition to or in place of illumination lens assembly 300, illumination subsystem 800 can include alternative light shaping optics, e.g. one or more diffusers, mirrors and prisms. In use, terminal 1000 can be oriented by an operator with respect to a target, (e.g., a piece of paper, a package, another type of substrate, screen, etc.) bearing decodable indicia 15 in such manner that the illumination pattern (not shown) is projected on decodable indicia 15. In the example of FIG. 2, decodable indicia 15 is provided by a 1D barcode symbol. Decodable indicia 15 could also be provided by a 2D barcode symbol or optical character recognition (OCR) characters. Referring to further aspects of terminal 1000, lens assembly 200 can be controlled with use of an electrical power input unit 1202 which provides energy for changing a plane of optimum focus of lens assembly 200. In one embodiment, electrical power input unit 1202 can operate as a controlled voltage source, and in another embodiment, as a controlled current source. Electrical power input unit 1202 can apply signals for changing optical characteristics of lens assembly 200, e.g., for changing a focal length and/or a best focus distance of (a plane of optimum focus of) lens assembly 200. A light source bank electrical power input unit 1206 can provide energy to light source bank 500. In one embodiment, electrical power input unit 1206 can operate as a controlled voltage source. In another embodiment, electrical power input unit 1206 can operate as a controlled current source. In another embodiment electrical power input unit 1206 can operate as a combined controlled voltage and controlled current source. Electrical power input unit 1206 can change a level of electrical power provided to (energization level of) light source bank 500, e.g., for changing a level of illumination output by light source bank 500 of illumination subsystem 800 for generating the illumination pattern.

In another aspect, terminal 1000 can include a power supply 1402 that supplies power to a power grid 1404 to which electrical components of terminal 1000 can be connected. Power supply 1402 can be coupled to various power sources, e.g., a battery 1406, a serial interface 1408 (e.g., USB, RS232), and/or AC/DC transformer 1410.

Further, regarding power input unit 1206, power input unit 1206 can include a charging capacitor that is continually charged by power supply 1402. Power input unit 1206 can be configured to output energy within a range of energization levels. An average energization level of illumination subsystem 800 during exposure periods with the first illumination and exposure control configuration active can be higher than an average energization level of illumination and exposure control configuration active.

Terminal 1000 can also include a number of peripheral devices including trigger 1220 which may be used to make active a trigger signal for activating frame readout and/or certain decoding processes. Terminal 1000 can be adapted so that activation of trigger 1220 activates a trigger signal and initiates a decode attempt. Specifically, terminal 1000 can be operative so that in response to activation of a trigger signal, a succession of frames can be captured by way of read out of image information from image sensor array 1033 (typically in the form of analog signals) and then storage of the image information after conversion into memory 1080 (which can buffer one or more of the succession of frames at a given time). Processor 1060 can be operative to subject one or more of the succession of frames to a decode attempt.

For attempting to decode a barcode symbol, e.g., a one dimensional barcode symbol, processor 1060 can process image data of a frame corresponding to a line of pixel positions (e.g., a row, a column, or a diagonal set of pixel positions) to determine a spatial pattern of dark and light cells and can convert each light and dark cell pattern determined into a character or character string via table lookup. Where a decodable indicia representation is a 2D barcode symbology, a decode attempt can comprise the steps of locating a finder pattern using a feature detection algorithm, locating matrix lines intersecting the finder pattern according to a predetermined relationship with the finder pattern, determining a pattern of dark and light cells along the matrix lines, and converting each light pattern into a character or character string via table lookup.

Terminal 1000 can include various interface circuits for coupling various peripheral devices to system address/data bus (system bus) 1500, for communication with processor 1060 also coupled to system bus 1500. Terminal 1000 can include an interface circuit 1028 for coupling image sensor timing and control circuit 1038 to system bus 1500, an interface circuit 1102 for coupling electrical power input unit 1202 to system bus 1500, an interface circuit 1106 for coupling illumination light source bank power input unit 1206 to system bus 1500, and an interface circuit 1120 for coupling trigger 1220 to system bus 1500. Terminal 1000 can also include display 1222 coupled to system bus 1500 and in communication with processor 1060, via an interface 1122, as well as pointer mechanism 1224 in communication with processor 1060 via an interface 1124 connected to system bus 1500. Terminal 1000 can also include keyboard 1226 coupled to systems bus 1500 and in communication with processor 1060 via an interface 1126. Terminal 1000 can also include range detector unit 1210 coupled to system bus 1500 via interface 1110. In one embodiment, range detector unit 1210 can be an acoustic range detector unit. Various interface circuits of terminal 1000 can share circuit components. For example, a common microcontroller can be established for providing control inputs to both image sensor timing and control circuit 1038 and to power input unit 1206. A common microcontroller providing control inputs to circuit 1038 and to power input unit 1206 can be provided to coordinate timing between image sensor array controls and illumination subsystem controls.

A succession of frames of image data that can be captured and subject to the described processing can be full frames (including pixel values corresponding to each pixel of image sensor array 1033 or a maximum number of pixels read out from image sensor array 1033 during operation of terminal 1000). A succession of frames of image data that can be captured and subject to the described processing can also be "windowed frames" comprising pixel values corresponding to less than a full frame of pixels of image sensor array 1033. A succession of frames of image data that can be captured and subject to the above described processing can also comprise a combination of full frames and windowed frames. A full frame can be read out for capture by selectively addressing pixels of image sensor 1032 having image sensor array 1033 corresponding to the full frame. A windowed frame can be read out for capture by selectively addressing pixels or ranges of pixels of image sensor 1032 having image sensor array 1033 corresponding to the windowed frame. In one embodiment, a number of pixels subject to addressing and read out determine a picture size of a frame. Accordingly, a full frame can be regarded as having a first relatively larger picture size and a windowed frame can be regarded as having a relatively smaller picture size relative to a picture size of a full frame. A picture size of a windowed frame can vary depending on the number of pixels subject to addressing and readout for capture of a windowed frame.

Terminal 1000 can capture frames of image data at a rate known as a frame rate. A typical frame rate is 60 frames per second (FPS) which translates to a frame time (frame period) of 16.6 ms. Another typical frame rate is 30 frames per second (FPS) which translates to a frame time (frame period) of 33.3 ms per frame. A frame rate of terminal 1000 can be increased (and frame time decreased) by decreasing of a frame picture size.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

The invention claimed is:

1. A terminal for measuring at least one dimension of an object, the terminal comprising:
   at least one imaging subsystem comprising an imaging optics assembly operable to focus an image onto an image sensor array, said imaging optics assembly having an optical axis;
   an actuator operable connected to said at least one imaging subsystem for moving the angle of said optical axis relative to said terminal;
   wherein said terminal is adapted to obtain a first image of at least a portion of the object;
   wherein said terminal is operable to determine at least one of a height, a width, and a depth dimension of the object based on effecting said actuator to change the angle of said optical axis relative to said terminal and to obtain a second image of said portion of the object by aligning the second image of said portion of the object with the first image of the portion of the object such that first image data and second image data are obtained along differently orientated optical axes with the images being aligned; and
   wherein, said terminal calculates the at least one of a height, a width, and a depth dimension of the object with trigonometric relations based on the change of the angle of said optical axis relative to said terminal without moving the terminal.

2. The terminal of claim 1 wherein said actuator comprises at least one shaped memory alloy element operable for moving said at least one imaging subsystem at an angle relative to said optical axis.

3. The terminal of claim 1 wherein said at least one imaging subsystem comprises a fixed imaging subsystem and a movable imaging subsystem.

4. The terminal of claim 1 wherein said at least one imaging subsystem comprises a single movable imaging subsystem, and wherein said single movable imaging subsystem is movable from a first location to a second location different from said first position.

5. The terminal of claim 4 wherein said actuator comprises at least one shaped memory alloy element for effecting movement of said at least one imaging subsystem.

6. The terminal of claim 1 further comprising an aimer for projecting an aiming pattern onto the object, and wherein said terminal is operable to effect movement of the actuator to align at least a portion of the aiming pattern on the object in the second image with at least a portion of the aiming pattern on the object in the first image.

7. The terminal of claim 1 wherein said terminal is operable to attempt to determine at least one of a height, a width, and a depth dimension of the object based on current supplied to said actuator for effecting alignment of the image of the object in the second image with the image of the object in the first image.

8. The terminal of claim 1 wherein said terminal is operable to attempt to determine at least one of a height, a width, and a depth dimension of the object based on voltage supplied to said actuator for effecting alignment of the image of the object in the second image with the image of the object in the first image.

9. The terminal of claim 1 wherein said at least one imaging subsystem comprises a fixed focused imaging subsystem.

10. The terminal of claim 1 wherein said terminal is operable to obtain the first image data and the second aligned image data simultaneously.

11. The terminal of claim 1 wherein said terminal is operable to obtain the first image and the second aligned image generally within about 0.5 second or less.

12. The terminal of claim 1 wherein said terminal is operable to determine the height, the width, and the depth dimensions of the object based on operation of said terminal directed from a single direction relative to said object.

13. The terminal of claim 1 wherein said terminal is operable to determine at least two of the height, the width, and the depth dimensions of the object based on operation of said terminal directed from at least two orthogonal directions relative to said object.

14. The terminal of claim 1 wherein said terminal operable for reading an optically decodable indicia associated with the object.

15. The terminal of claim 1 wherein the actual size of the object relative to the size of the object observed on an image sensor array is the distance from the object to the imaging lens times the dimension of the object divided by the focal length of the imaging optics lens.

16. A method for measuring at least one dimension of an object the method comprising:
   obtaining at least a portion of first image data of the object;
   moving an optical axis of at least one imaging subsystem to align at least a portion of second image data of the object with the at least the portion of first image data, the at least the portion of first image data being different from the at least the portion of second image data;
   determining at least one of a height, a width, and a depth dimension of the object based on moving the optical axis of the at least one imaging subsystem to align a second image of the at least the portion of the object in the second image data with the image of the at least the portion of the object in the first image data;
   wherein, said determining of the at least one of a height, a width, and a depth dimension of the object is with trigonometric relations based on the change of an angle of said optical axis relative to said terminal such that first image data and second image data are obtained along differently orientated optical axes with the images being aligned;
   wherein, said terminal calculates the at least one of a height, a width, and a depth dimension of the object with trigonometric relations based on the change of the angle of said optical axis relative to said terminal without moving the terminal.

17. The method of claim 16 wherein the moving an optical axis comprises moving the optical axis at an angle based on operation of at least one shaped memory alloy element.

18. The method of claim 16 further comprising projecting an aiming pattern onto the object, and wherein the moving the optical axis comprises moving the optical axis of at least one imaging subsystem to align at least a portion of the projected aiming pattern on the second image data of the object with the at least a portion of the projected aiming pattern on the first image data of the object.

19. The method of claim 16 wherein the obtaining the first image data of the at least the portion of the object comprises obtaining the first image data of the at least the portion of the object with an imaging subsystem having an optical axis fixed relative to the terminal.

20. The method of claim 16 wherein the at least one imaging subsystem comprises a single movable imaging subsystem, and wherein single movable imaging subsystem is operable to obtain the first image data of the at least the portion of the object at a first location, and obtain the second image data of the at least the portion of the object at a second location different from the first location.

21. The method of claim 16 wherein the first image data and the second aligned image data are obtained simultaneously.

22. The method of claim 16 wherein the first image data and the second aligned image data are obtained within about 0.5 second or less.

23. The method of claim 16 wherein the determining the height, the width, and the depth dimensions of the object is based on operation of said terminal directed from a single direction relative to said object.

24. The method of claim 16 wherein the determining the height, the width, and the depth dimensions of the object is based on operation of said terminal directed from at least two orthogonal directions relative to said object.

25. The method of claim 16 wherein said terminal is operable for reading an optically decodable indicia associated with the object.

26. The method of claim 16 wherein the actual size of the object relative to the size of the object observed on an image sensor array is the distance from the object to the imaging lens times the dimension of the object divided by the focal length of the imaging optics lens.

* * * * *